US012541158B2

(12) United States Patent
Inukai et al.

(10) Patent No.: US 12,541,158 B2
(45) Date of Patent: Feb. 3, 2026

(54) TONER FOR ELECTROSTATIC CHARGE IMAGE DEVELOPMENT, ELECTROSTATIC CHARGE IMAGE DEVELOPER, TONER CARTRIDGE, PROCESS CARTRIDGE, IMAGE FORMING APPARATUS, AND IMAGE FORMING METHOD

(71) Applicant: FUJIFILM Business Innovation Corp., Tokyo (JP)

(72) Inventors: Takashi Inukai, Kanagawa (JP); Atsushi Sugawara, Kanagawa (JP); Kazutsuna Sasaki, Kanagawa (JP); Yoshimasa Fujihara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 600 days.

(21) Appl. No.: 17/993,825

(22) Filed: Nov. 23, 2022

(65) Prior Publication Data

US 2023/0161279 A1 May 25, 2023

(30) Foreign Application Priority Data

Nov. 25, 2021 (JP) ................................ 2021-191419

(51) Int. Cl.

| | |
|---|---|
| ***G03G 9/087*** | (2006.01) |
| ***G03G 9/08*** | (2006.01) |
| ***G03G 15/08*** | (2006.01) |

(52) U.S. Cl.

CPC ....... *G03G 9/08788* (2013.01); *G03G 9/0819* (2013.01); *G03G 9/0827* (2013.01); *G03G 9/08711* (2013.01); *G03G 9/08755* (2013.01); *G03G 9/08764* (2013.01); *G03G 15/0865* (2013.01)

(58) Field of Classification Search

CPC ............ G03G 9/0825; G03G 9/08711; G03G 9/08782

See application file for complete search history.

(56) References Cited

U.S. PATENT DOCUMENTS

| | | | | |
|---|---|---|---|---|
| 10,520,841 | B2 | 12/2019 | Sato et al. | |
| 2010/0196817 | A1 * | 8/2010 | Sasaki .................... | G03G 15/08 525/437 |
| 2016/0363878 | A1 | 12/2016 | Hama et al. | |

FOREIGN PATENT DOCUMENTS

| | | | |
|---|---|---|---|
| JP | 2004-287185 | * 10/2004 | ............... G03G 9/08 |
| JP | 2006337902 | 12/2006 | |
| JP | 2016-184134 | * 10/2016 | ............... G03G 9/08 |

(Continued)

OTHER PUBLICATIONS

Translation of JP 2004-287185.*

(Continued)

*Primary Examiner* — Peter L Vajda
(74) *Attorney, Agent, or Firm* — JCIPRNET

(57) ABSTRACT

A toner for electrostatic charge image development includes toner particles, the toner particles containing a binder resin containing a vinyl resin and a release agent containing an ester wax, in which in sections of the toner particles, a number average of equivalent circle diameters of sections of domains of the release agent is 0.10 μm or more and 1.5 μm or less, and a standard deviation of the equivalent circle diameters is more than 0.05 and 0.5 or less.

13 Claims, 2 Drawing Sheets

(56) References Cited

FOREIGN PATENT DOCUMENTS

| | | |
|---|---|---|
| JP | 2017003990 | 1/2017 |
| JP | 2019168618 | 10/2019 |

OTHER PUBLICATIONS

Translation of JP 2016-184134.*
"Office Action of Japan Counterpart Application", issued on Jul. 8, 2025, with English translation thereof, p. 1-p. 5.
"Decision of Refusal of Japan Counterpart Application", issued on Dec. 2, 2025, with English translation thereof, p. 1-p. 2.

* cited by examiner

TONER FOR ELECTROSTATIC CHARGE IMAGE DEVELOPMENT, ELECTROSTATIC CHARGE IMAGE DEVELOPER, TONER CARTRIDGE, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2021-191419 filed on Nov. 25, 2021.

BACKGROUND

(i) Technical Field

The present invention relates to a toner for electrostatic charge image development, an electrostatic charge image developer, a toner cartridge, a process cartridge, an image forming apparatus, and an image forming method.

(ii) Related Art

JP2016-184134A discloses a toner for electrostatic charge image development containing a binder resin, a coloring agent, a release agent, and a plasticizer, wherein an average dispersion particle size Dw of domains of the release agent, an average dispersion number Nw of the domains of the release agent, an average dispersion particle size Dc of domains of the plasticizer, and an average dispersion number Nc of the domains of the plasticizer satisfy a specific relationship.

JP2019-168618A discloses a toner for electrostatic charge image development including: toner particles containing a binder resin containing a hybrid resin in which a non-crystalline resin unit other than a polyester resin and a crystalline polyester resin unit are chemically bonded to each other, a vinyl resin, and a release agent including a hydrocarbon wax; and an external additive, wherein the toner particles includes a domain of the hybrid resin and a domain of the release agent, and a relationship between an average distance Lhyb from surfaces of the toner particles to the center of the domain of the hybrid resin and an average distance Lwax from surfaces of the toner particles to the center of the domain of the release agent is Lwax<Lhyb.

In image formation using a toner for electrostatic charge image development, for example, a toner image formed on a surface of an image holding member is transferred onto a surface of a recording medium and fixed to form an image.

When an image is formed under a high-temperature and high-humidity environment (for example, under an environment of a temperature of 28° C. and a humidity of 85%) using a toner having toner particles containing a binder resin containing a vinyl resin and a release agent containing an ester wax, an image with fogging may be obtained because of irregular movement paths of the toner particles at the time of transferring the toner image.

SUMMARY

Aspects of non-limiting embodiments of the present disclosure relate to a toner for electrostatic charge image development that inhibits both generation of color streaks due to cleaning failure and fogging in an image formed under a high-temperature and high-humidity environment as compared with toner particles including a binder rein containing a vinyl resin and a release agent containing an ester wax, wherein the number average of equivalent circle diameters of sections of domains of the release agent is less than 0.10 μm or more than 1.5 μm, or the standard deviation of the equivalent circle diameters is 0.05 or less or more than 0.5.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a toner for electrostatic charge image development including toner particles, the toner particles containing a binder resin containing a vinyl resin and a release agent containing an ester wax, wherein in sections of the toner particles, a number average of equivalent circle diameters of sections of domains of the release agent is 0.10 μm or more and 1.5 μm or less, and a standard deviation of the equivalent circle diameters is more than 0.05 and 0.5 or less.

DETAILED DESCRIPTION

Figure 1:
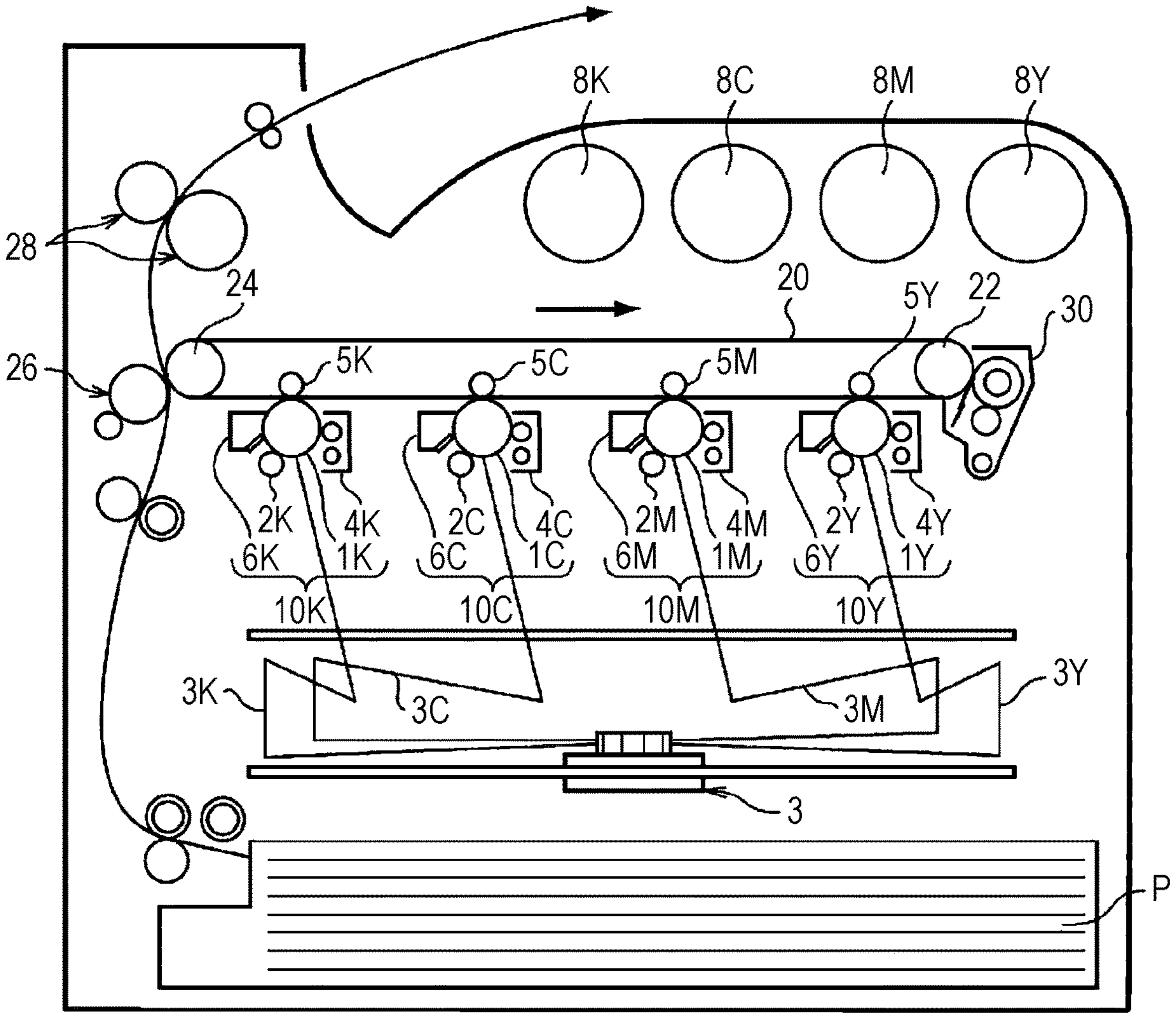
FIG. 1 is a schematic diagram illustrating an example of an image forming apparatus according to an exemplary embodiment.

Hereinafter, exemplary embodiments of the present invention will be described. These descriptions and examples illustrate the exemplary embodiments and do not limit the scope of the invention.

The upper limit or the lower limit in one numerical range in stepwise numerical ranges in the present specification may be replaced with the upper limit or the lower limit of another stepwise numerical range. The upper limit or the lower limit of any numerical range described in the present specification may be replaced with a value described in Examples.

In the present specification, "(meth)acrylic" means both acrylic and methacrylic. In the present specification, "(meth) acryloyl group" means both an acryloyl group and a methacryloyl group.

In the present specification, the term "step" includes not only an independent step but also a step that cannot be clearly distinguished from other steps but achieves the purpose of the step.

Each component may include a plurality of corresponding substances.

The amount of each component in a composition refers to, when there are a plurality of substances corresponding to each component in the composition, the total amount of the plurality of substances present in the composition unless otherwise specified.

[Toner for Electrostatic Charge Image Development] A toner for electrostatic charge image development (hereinafter also referred to as "toner") according to an exemplary embodiment includes toner particles containing a binder resin containing a vinyl resin and a release agent containing an ester wax, wherein in sections of the toner particles, a number average of equivalent circle diameters of sections of domains of the release agent is 0.10 μm or more and 1.5 μm or less, and a standard deviation of the equivalent circle diameters is more than 0.05 and 0.5 or less. Hereinafter, the domain of the release agent is referred to as "release agent domain", and the equivalent circle diameter of a section of the release agent domain is referred to as "release agent domain diameter".

The toner according to the exemplary embodiment having the above-described structure inhibits both generation of color streaks due to cleaning failure and fogging in an image formed in a high-temperature and high-humidity environment. The reason of the achievement is not clear, and the following may be assumed.

In toner particles containing a binder resin containing a vinyl resin and a release agent containing an ester wax, because the affinity between the vinyl resin and the ester wax is low, the equivalent circle diameter of a release agent domain present in the toner particles tends to be large. Because the ester wax has a lower specific weight than the vinyl resin, the presence of the release agent domain having a large equivalent circle diameter in toner particles may result in the centers of gravity of the toner particles being separated from the centers of the particles. When an image is formed in a high-temperature and high-humidity environment using toner including decentered toner particles, the movement paths of the toner particles become irregular in transfer of the toner image, and an image with fogging may be obtained.

In the exemplary embodiment, the number average of the release agent domain diameters is within the above-described range, and the standard deviation of the release agent domain diameters is within the above-described range. That is, in the exemplary embodiment, it is considered that the occurrence of fogging caused by decentering of the toner particles is inhibited because the number of release agent domains having a large release agent domain diameter is small in the toner particles. When the number average of the release agent domain diameters is less than 0.10 μm, the release agent may be partially exposed on the surface of toner particles and may cause fogging in an image because of low charging. However, fogging due to low charging is also inhibited in the exemplary embodiment because the number average of the release agent domain diameters is within the above-described range.

When the standard deviation of the release agent domain diameters is 0.05 or less, toner remaining on a contact part between the photoreceptor and the mechanism that cleans the photoreceptor rolls uniformly and have a low binding property. The remaining toner slips from the cleaning part without forming a toner aggregation to be large, which may cause color streaks due to cleaning failure. However, the exemplary embodiment, in which the standard deviation of the release agent domain diameters is in the above-described range, inhibits generation of color streaks due to cleaning failure.

It is assumed that both color streaks due to cleaning failure and fogging in an image formed in a high-temperature and high-humidity environment are inhibited in the exemplary embodiment because of these reasons.

<Release Agent Domain>

(Measurement Method)

The observation of the release agent domain is performed as follows.

Toner particles (or toner particles with an external additive attached) are mixed with an epoxy resin and embedded, and the epoxy resin is solidified. The obtained solidified product is cut with an ultramicrotome device (UltracutUCT manufactured by Leica), whereby a thin sample having a thickness of 80 nm or more and 130 nm or less is produced. Next, the obtained thin sample is stained with ruthenium tetraoxide in a desiccator at 30° C. for 3 hours. Then, an STEM observation image (acceleration voltage: 30 kV, magnification: 20,000 times) in transmission image mode of the stained thin sample is obtained with an ultra-high-resolution field emission scanning electron microscope (FE-SEM. S-4800 manufactured by Hitachi High-Technologies Corporation).

The contour of the release agent domain in the toner particles is determined from the contrast and shape of the obtained STEM observation image. In the STEM image, because the binder resin other than the release agent has many double bond parts and is stained with ruthenium tetroxide, the release agent part and the binder resin part other than the release agent are distinguished from each other.

That is, with ruthenium staining, the release agent domain is stained most lightly, and the non-crystalline resin is stained most darkly. By adjusting the contrast, the release agent is observed in white, and the non-crystalline resin is observed in black, and thus the sectional shape of the release agent domain is confirmed.

By observing 100 toner particles and analyzing the regions of the release agent domain, the release agent domain diameter of each release agent domain is determined, and the number average and standard deviation of the domain diameters are calculated.

The STEM image includes sections of toner particles having different sizes, from which sections of toner particles having a diameter of 50% or more of the volume-average particle diameter of the toner particles are selected and used as toner particles to be observed. The diameter of a section of a toner particle refers to the diameter of a circle having the same area as the section of the toner particle (so-called equivalent circle diameter).

(Distribution of Release Agent Domain Diameters)

In the exemplary embodiment, as described above, the number average of the release agent domain diameters is 0.10 μm or more and 1.5 μm or less, preferably 0.5 μm or more and 1.2 μm or less and more preferably 0.8 μm or more and 1.2 μm or less from the viewpoint of inhibiting fogging in an image formed in a high-temperature and high-humidity environment.

In the exemplary embodiment, as described above, the standard deviation of the release agent domain diameters is more than 0.05 and 0.5 or less, preferably 0.08 or more and 0.4 or less, and more preferably 0.08 or more and 0.3 or less from the viewpoint of inhibiting both generation of color streaks due to cleaning failure and fogging in an image formed in a high-temperature and high-humidity environment.

In the exemplary embodiment, it is preferable that the sections of domains of the release agent having an equivalent circle diameter of one third or more of a volume-average particle diameter of the toner particles be 0.5% by number or less relative to the total number of the sections of domains of the release agent present in the sections of the toner particles. Hereinafter, the release agent domain having an equivalent circle diameter of one third or more of the volume-average particle diameter of the toner particles is also referred to as "large-diameter domain", and the proportion of the large-diameter domain to the total number of release agent domains present in a section of a toner particle is also referred to as "large-diameter domain proportion".

When the large-diameter domain proportion is within the above-described range, the occurrence of fogging caused by decentering of toner particles in image formation in a high-temperature and high-humidity environment is inhibited as compared with the case where the proportion is larger than the above-described range.

The large-diameter domain proportion is more preferably 0.3% by number or less, and still more preferably 0.1% by number or less.

(Section Shape of Release Agent Domain)

The section shape of the release agent domain is not limited, and examples thereof include a circular shape, an elliptical shape, and an irregular shape. Among these shapes, the section shape of the release agent domain is preferably a circular shape. It is considered that the release agent domain having a circular section is less likely to be distributed unevenly in the toner particles, which inhibits decentering of the toner particles. Thus, fogging caused by decentering of toner particles in image formation in a high-temperature and high-humidity environment is inhibited.

The average circularity of sections of the release agent domains is preferably 0.90 or more, more preferably 0.93 or more, and still more preferably 0.95 or more. It is considered that the release agent domains having sections with an average circularity within the above-described range is less likely be distributed unevenly in the toner particles than release agent domains having sections with an average circularity without the above-described range, which inhibits decentering of the toner particles. Thus, fogging caused by decentering of toner particles in image formation in a high-temperature and high-humidity environment is inhibited.

The upper limit of the average circularity of sections of the release agent domains is not limited, and may be, for example, 0.99.

The average circularity of sections of the release agent domains is the number average of the circularities of the release agent domains in the STEM image, and the circularity of each release agent domain is obtained by dividing the circle equivalent circumference (that is, the circumference of a circle having the same area as the section of the release agent domain) by the actual circumference.

Examples of the method for controlling the average circularity of sections of the release agent domains include, in the case of producing toner particles by an aggregation coalescence method described later, a method in which the temperature and time in a fusion-coalescence step are adjusted and a method in which a mixture of a plurality of release agents is used.

(Distribution Control of Release Agent Domain Diameter)

There are no particular limitations on the method for controlling the release agent domain diameter distribution to cause the number average of release agent domain diameters, the standard deviation of the release agent domain diameters, and the large-diameter domain proportion to fall within the above-described ranges.

Examples of a method for controlling the distribution of the release agent domain diameters include adjusting the stirring speed in an aggregated particle forming step in the case of producing toner particles by the aggregation coalescence method described later, using a surfactant having a polarity opposite to the polarity of a surfactant used in the resin particle dispersion as the surfactant used in the release agent particle dispersion, or combining these methods. Hereinafter, the method in which a surfactant having a polarity opposite to that of the surfactant used in a resin particle dispersion is used as the surfactant used in a release agent particle dispersion is also referred to as "opposite polarity surfactant method".

In adjusting the stirring speed in the aggregated particle forming step, as the stirring speed increases, the number average of the release agent domains decreases, the standard deviation of the release agent domain diameters decreases, and the large-diameter domain proportion decreases. As the stirring speed decreases, the number average of release agent domains increases, the standard deviation of release agent domain diameters increases, and the large-diameter domain proportion increases.

In the opposite polarity surfactant method, specifically, for example, when an anionic surfactant is used for the resin particle dispersion, a cationic surfactant is used as the surfactant for the release agent particle dispersion, and when a cationic surfactant is used for the resin particle dispersion, an anionic surfactant is used as the surfactant for the release agent particle dispersion.

Use of the opposite polarity surfactant method tends to cause the number average of release agent domains to decrease, the standard deviation of release agent domain diameters to decrease, and the large-diameter domain proportion to decrease. It is unclear why the distribution of the release agent domain diameters is controlled by the opposite polarity surfactant method, but the reason is assumed as follows.

For example, when a resin particle dispersion in which binder resin particles are dispersed contains an anionic surfactant, toner particles are formed by using a release agent particle dispersion containing a cationic surfactant, whereby the release agent domain diameter in the toner particles is likely to be small, and large-diameter domains are unlikely to be formed. Specifically, it is assumed that the polarity of the resin particles and the polarity of the release agent particles being opposite to each other increase the affinity between the resin particles and the release agent particles, and in the process of aggregation, the resin particles surround the release agent particles to inhibit aggregation of the release agent particles, which causes the number average of the release agent domain diameters, the standard deviation of the release agent domain diameters, and the large-diameter domain proportion to be controlled within the above-described ranges.

Hereinafter, the toner according to an exemplary embodiment will be described in detail.

The toner according to the exemplary embodiment includes toner particles and, as necessary, an external additive.

(Toner Particles)

The toner particles include, for example, a binder resin, a release agent, and as necessary, a coloring agent and other additives.

—Binder Resin—

In the exemplary embodiment, the binder resin contains at least a vinyl resin.

The vinyl resin refers to a resin obtained by radically polymerizing a monomer having a vinyl group (hereinafter, also referred to as "vinyl group-based monomer"). The vinyl resin may be a homopolymer obtained by polymerizing one type of vinyl group-based monomer, may be a copolymer obtained by polymerizing two or more types of vinyl group-based monomers, or may be a copolymer obtained by polymerizing a vinyl group-based monomer and another monomer (for example, a hybrid resin described later).

Examples of the vinyl resin include homopolymers of monomers such as monomers having a styrene skeleton (e.g., styrene, parachlorostyrene, and a-methylstyrene), monomers having a (meth)acrylic acid ester skeleton (e.g., methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), monomers having an ethylenically unsaturated nitrile skeleton (e.g., acrylonitrile and methacrylonitrile), monomers having a vinyl ether skeleton (e.g., vinyl methyl ether and vinyl isobutyl ether), monomers having a vinyl ketone skeleton (e.g., vinyl methyl ketone, vinyl ethyl ketone, and vinyl isopropenyl ketone), monomers having an olefin skeleton (e.g., ethylene, propylene, and butadiene), and copolymers obtained by combining two or more of these monomers.

Among them, the vinyl resin preferably contains at least one selected from the group consisting of a hybrid resin in which a crystalline polyester resin unit and non-crystalline resin unit other than a polyester resin are chemically bonded, and a styrene (meth)acrylic resin, from the viewpoint of obtaining stable charging characteristics for controlling the moving path of toner. The vinyl resin may include only one of a hybrid resin and a styrene (meth)acrylic resin, or may include both a hybrid resin and a styrene (meth)acrylic resin.

—Styrene (Meth)Acrylic Resin—

Among them, the vinyl resin preferably contains a styrene (meth)acrylic resin obtained by copolymerizing a monomer having a styrene skeleton and a monomer having a (meth) acrylic acid ester skeleton from the viewpoint of obtaining stable charging characteristics for controlling the movement path of toner. The styrene (meth)acrylic resin may be a copolymer obtained by polymerizing a monomer having a styrene skeleton, a monomer having a (meth)acrylic acid ester skeleton, and another monomer, or may be a hybrid resin having a styrene (meth)acrylic resin unit.

It is assumed that the vinyl resin containing a styrene (meth)acrylic resin, which is electrically neutral, has stable charging characteristics.

When the vinyl resin contains a styrene (meth)acrylic resin, the affinity between the styrene (meth)acrylic resin and the ester wax is low, and thus the release agent domain diameter tends to be large. However, in the exemplary embodiment, because the number average and the standard deviation of the release agent domain diameters are within the above-described range, the occurrence of fogging caused by decentering of toner particles is inhibited. The vinyl resin may contain only one styrene (meth)acrylic resin or may contain two or more styrene (meth)acrylic resins.

The styrene (meth)acrylic resin is a copolymer obtained by copolymerizing at least a monomer having a styrene skeleton and a monomer having a (meth)acryloyl group.

Examples of the monomer having a styrene skeleton (hereinafter, also referred to as "styrene-based monomer") include styrene, alkyl-substituted styrene (e.g., α-methylstyrene, 2-methyl styrene, 3-methyl styrene, 4-methyl styrene, 2-ethyl styrene, 3-ethyl styrene, and 4-ethylstyrene), halogen-substituted styrene (e.g., 2-chlorostyrene, 3-chlorostyrene, and 4-chlorostyrene), and vinylnaphthalene. The styrene-based monomers may be used alone or in combination of two or more thereof.

Among them, styrene is preferable as the styrene-based monomer from the viewpoint of ease of reaction, ease of reaction control, and availability.

Examples of the monomer having a (meth)acryloyl group (hereinafter, also referred to as "(meth)acrylic monomer") include a (meth)acrylic acid and a (meth)acrylic acid ester. Examples of the (meth)acrylic acid ester include alkyl (meth)acrylates ester (e.g., n-methyl (meth)acrylate, n-ethyl (meth)acrylate, n-propyl (meth)acrylate, n-butyl (meth) acrylate, n-pentyl (meth)acrylate, n-hexyl acrylate, n-heptyl (meth)acrylate, n-octyl (meth)acrylate, n-decyl (meth)acrylate, n-dodecyl (meth)acrylate, n-lauryl (meth)acrylate, n-tetradecyl (meth)acrylate, n-hexadecyl (meth)acrylate, n-octadecyl (meth)acrylate, isopropyl (meth)acrylate, isobutyl (meth)acrylate, t-butyl (meth)acrylate, isopentyl (meth)acrylate, amyl (meth)acrylate, neopentyl (meth)acrylate, isohexyl (meth)acrylate, isoheptyl (meth)acrylate, isooctyl (meth)acrylate, 2-ethylhexyl (meth)acrylate, cyclohexyl (meth)acrylate, and t-butylcyclohexyl (meth)acrylate), aryl (meth)acrylate esters (e.g., phenyl (meth)acrylate, biphenyl (meth)acrylate, diphenylethyl (meth)acrylate, t-butylphenyl (meth)acrylate, and terphenyl (meth)acrylate, dimethylaminoethyl (meth)acrylate, diethylaminoethyl (meth)acrylate, methoxyethyl (meth)acrylate, 2-hydroxyethyl (meth)acrylate, β-carboxyethyl (meth)acrylate, and (meth)acrylamide). The (meth)acrylic acid-based monomers may be used alone or in combination of two or more thereof.

The copolymerization ratio of the styrene-based monomer and the (meth)acrylic-based monomer (mass basis, styrene-based monomer/(meth)acrylic-based monomer) is preferably, for example, 85/15 to 70/30.

—Styrene (Meth)Acrylic Resin Having Crosslinked Structure—

It is preferable that the styrene (meth)acrylic resin has a crosslinked structure from the viewpoint of inhibiting offset of an image. Examples of the styrene (meth)acrylic resin having a crosslinked structure include a crosslinked product obtained by copolymerizing at least a monomer having a styrene skeleton, a monomer having a (meth)acrylic acid skeleton, and a crosslinkable monomer.

The vinyl resin may include both a styrene (meth)acrylic resin having a crosslinked structure and a vinyl resin having no crosslinked structure.

Examples of the crosslinkable monomer include bifunctional or higher crosslinking agents.

Examples of the bifunctional crosslinking agent include divinylbenzene, divinylnaphthalene, di(meth)acrylate compounds (e.g., diethylene glycol di(meth)acrylate, methylene bis(meth)acrylamide, decanediol diacrylate, and glycidyl (meth)acrylate), polyester-type di(meth)acrylate, and 2-([1'-methylpropylideneamino]carboxyamino)ethyl methacrylate.

Examples of the polyfunctional crosslinking agent include tri(meth)acrylate compounds (e.g., pentaerythritol tri(meth)acrylate, trimethylolethane tri(meth)acrylate, and trimethylolpropane tri(meth)acrylate), tetra(meth)acrylate compounds (e.g., tetramethylolmethane tetra(meth)acrylate and oligoester (meth)acrylate), 2,2-bis(4-methacryloxy, polyethoxyphenyl)propane, diallyl phthalate, triallyl cyanurate, triallyl isocyanurate, triallyl trimellitate, and diarylchloridate.

The copolymerization ratio of the crosslinkable monomers to all monomers (mass basis, crosslinkable monomers/all monomers) is preferably, for example, 2/1,000 or more and 30/1,000 or less.

The weight-average molecular weight of the styrene (meth)acrylic resin having a crosslinked structure is, for example, preferably 30,000 or more and 200,000 or less, preferably 40,000 or more and 100,000 or less, and more preferably 50,000 or more and 80,000 or less from the viewpoint of inhibiting offset of an image.

The weight-average molecular weight of the styrene (meth)acrylic resin having a crosslinked structure is measured by the same method as measuring the weight-average molecular weight of the polyester resin described later.

The content of the styrene (meth)acrylic resin having a crosslinked structure is, for example, preferably 10 mass % or more and 95 mass % or less, preferably 12 mass % or more and 90 mass % or less, more preferably 15 mass % or more and 85 mass % or less, and particularly preferably 60 mass % or more and 85 mass % or less relative to the entire vinyl resin.

The content of the styrene (meth)acrylic resin having a crosslinked structure is, for example, preferably 10 mass % or more and 95 mass % or less, preferably 12 mass % or more and 90 mass % or less, more preferably 15 mass % or more and 85 mass % or less, and particularly preferably 60 mass % or more and 85 mass % or less relative to the entire binder resin.

—Hybrid Resin—

The vinyl resin preferably contains a hybrid resin in which a non-crystalline resin unit other than a polyester resin and a crystalline polyester resin unit are chemically bonded. The hybrid resin contains a non-crystalline vinyl resin unit as the non-crystalline resin unit other than a polyester resin. The hybrid resin may contain a non-crystalline styrene (meth)acrylic resin unit as the non-crystalline vinyl resin unit. That is, the hybrid resin may be one type of the above-described styrene (meth)acrylic resin.

It is assumed that the vinyl resin containing a hybrid resin has low-temperature fixability because of improved internal dispersibility of the crystalline polyester having a low melting point in toner.

When the vinyl resin contains a hybrid resin, the hybrid resin has a plurality of types of units, and thus homoaggregation of resin particles is likely to occur, resulting in an increase in the release agent domain diameter. However, in the exemplary embodiment, because the number average and standard deviation of the release agent domain diameters are within the above-described ranges, occurrence of fogging caused by decentering of toner particles is inhibited. The vinyl resin may contain only one hybrid resin and may contain two or more hybrid resins.

The vinyl resin may contain both a hybrid resin and a resin other than the hybrid resin, may contain a hybrid resin and a styrene (meth)acrylic resin other than the hybrid resin, may contain a hybrid resin and a styrene (meth)acrylic resin having a crosslinked structure other than the hybrid resin, or may contain a hybrid resin that is a styrene (meth)acrylic resin and a styrene (meth)acrylic resin having a crosslinked structure other than the hybrid resin.

The hybrid resin is a resin in which a non-crystalline resin unit other than a polyester resin and a crystalline polyester resin unit are chemically bonded.

The crystalline polyester resin unit refers to a resin part having a structure derived from a crystalline polyester resin. The non-crystalline resin unit refers to a resin part having a structure derived from a non-crystalline resin.

The term "crystalline" regarding resin means that the resin shows a distinct endothermic peak rather than stepwise endothermic changes as measured by differential scanning calorimetry (DSC) and specifically means that the half width of the endothermic peak in measuring at a heating rate of 10 (° C./min) is within 10° C.

The term "non-crystalline" regarding resin means that the resin shows a half width of more than 10° C., shows stepwise endothermic changes, or shows no distinct endothermic peak.

Hereinafter, a crystalline polyester resin unit (A) and a non-crystalline resin unit (B) will be described.

(A) Crystalline Polyester Resin Unit

Examples of the crystalline polyester resin forming the crystalline polyester resin unit (hereinafter also simply referred to as "crystalline polyester resin") include a polycondensate of a polyhydric carboxylic acid and a polyhydric alcohol. As the crystalline polyester resin, a commercially available product may be used, or a synthesized product may be used.

Examples of the polyhydric carboxylic acid include aliphatic dicarboxylic acids (e.g., oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (e.g., phthalic acid, isophthalic acid, terephthalic acid, and dibasic acids such as naphthalene-2,6-dicarboxylic acid), anhydrides thereof, and lower (e.g., having 1 to 5 carbon atoms) alkyl esters thereof.

As the polyhydric carboxylic acid, a trihydric or higher carboxylic acid having a crosslinked structure or a branched structure may be used in combination with the dicarboxylic acid. Examples of the trihydric carboxylic acid include aromatic carboxylic acids (e.g., 1,2,3-benzenetricarboxylic acid, 1,2,4-benzenetricarboxylic acid, and 1,2,4-naphthalenetricarboxylic acid), anhydrides thereof, and lower (e.g., having 1 to 5 carbon atoms) alkyl esters thereof.

As the polyhydric carboxylic acid, a dicarboxylic acid having a sulfonic acid group and a dicarboxylic acid having an ethylenic double bond may be used in combination with these dicarboxylic acids.

The polyhydric carboxylic acid may be used alone or in combination of two or more thereof.

Examples of the polyhydric alcohol include an aliphatic diol (e.g., a linear aliphatic diol having 7 to 20 carbon atoms in the main chain part). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecandiol, 1,12-dodecanediol, 1,13-tridecandiol, 1,14-tetradecandiol, 1,18-octadecandiol, and 1,14-eicosandecanediol. Among them, 1,8-octanediol, 1,9-nonanediol, and 1,10-decanediol are preferable as the aliphatic diol.

As the polyhydric alcohol, a trihydric or higher alcohol having a crosslinked structure or a branched structure may be used in combination with the diol. Examples of the trihydric or higher alcohol include glycerin, trimethylolethane, trimethylolpropane, and pentaerythritol.

The polyhydric alcohol may be used alone or in combination of two or more thereof.

Here, the content of the aliphatic diol in the polyhydric alcohol is preferably 80 mol % or more, and preferably 90 mol % or more.

The crystalline polyester resin unit is preferably a crystalline aliphatic polyester resin obtained from an aliphatic polyhydric carboxylic acid component and an aliphatic polyhydric alcohol component from the viewpoint of low-temperature fixability.

The aliphatic polyhydric carboxylic acid component is preferably a polyhydric carboxylic acid component having 8 to 22 carbon atoms.

The aliphatic polyhydric alcohol component is preferably a polyhydric alcohol component having 4 to 10 carbon atoms.

The sum of the number of carbon atoms in the aliphatic polyhydric carboxylic acid component and the number of carbon atoms in the aliphatic polyhydric alcohol component is preferably 8 or more and 22 or less, more preferably 10 or more and 20 or less, and still more preferably 12 or more and 18 or less.

The number of carbon atoms in the aliphatic polyhydric carboxylic acid component represents the total number of carbon atoms including carbon of a carboxy group. When a plurality of aliphatic polyhydric carboxylic acid components are used, a value obtained by calculating a weighted average based on the molar ratio of each polyhydric carboxylic acid component is defined as the number of carbon atoms in the polyhydric carboxylic acid component. When a plurality of aliphatic polyhydric alcohol components are used as well, a value obtained by calculating a weighted average based on the molar ratio of each polyhydric alcohol component is defined as the number of carbon atoms in the polyhydric alcohol component.

The number of carbon atoms in the polyhydric carboxylic acid component and the number of carbon atoms in the polyhydric alcohol component in the crystalline aliphatic polyester resin are measured through pyrolysis gas chromatography mass spectrometry (pyrolysis-GCMS).

The melting temperature of the crystalline polyester resin is preferably 50° C. or more and 100° C. or less, more preferably 55° C. or more and 90° C. or less, and still more preferably 60° C. or more and 85° C. or less.

The melting temperature is determined from a DSC curve obtained by differential scanning calorimetry (DSC) in accordance with "melting peak temperature" described in the method for obtaining a melting temperature in JIS K 7121:1987 "Testing methods for transition temperatures of plastics".

The weight-average molecular weight (Mw) of the crystalline polyester resin is preferably 6,000 or more and 35,000 or less.

The method for measuring the weight-average molecular weight is as described later.

The crystalline polyester resin may be produced by any known method, for example, in the same manner as in the case of the non-crystalline resin described below.

(B) Non-Crystalline Resin Unit Other Than Polyester Resin

Hereinafter, the non-crystalline resin unit other than a polyester resin will be described.

The non-crystalline resin that forms the non-crystalline resin unit (hereinafter, also simply referred to as "non-crystalline resin") contains at least a non-crystalline vinyl resin (e.g., polystyrene resin or styrene (meth)acrylic resin), and may contain a non-crystalline resin other than the non-crystalline vinyl resin (e.g., epoxy resin, polycarbonate resin, or polyurethane resin).

Among them, the non-crystalline resin preferably contains at least one selected from the group consisting of a polystyrene resin and a styrene (meth)acrylic resin, and more preferably further includes a polyurethane resin from the viewpoint of low-temperature fixability. As the non-crystalline resin, a commercially available product may be used, or a synthesized product may be used.

Examples of the polystyrene resin include a homopolymer or copolymer of a monomer having a styrene skeleton. Examples of the monomer having a styrene skeleton include styrene; alkyl-substituted styrenes having alkyl chains, such as a-methylstyrene, 4-methylstyrene, 2-methyl styrene, 3-methyl styrene, 2-ethyl styrene, 3-ethyl styrene, and 4-ethyl styrene; halogen-substituted styrenes such as 2-chlorostyrene, 3-chlorostyrene, 4-chlorostyrene, 4-fluorostyrene, and 2,5-difluorostyrene; and vinylnaphthalene.

Examples of the styrene (meth)acrylic resin include the styrene (meth)acrylic resin described above.

Examples of the polyurethane resin include a polyurethane resin obtained by reacting a resin having an OH group (at least one selected from the group consisting of a polyvinyl acetal resin, a polyvinyl resin, casein, a phenol resin, and the like) with an isocyanate compound (aromatic polyisocyanate, aliphatic polyisocyanate, alicyclic polyisocyanate, etc.).

The isocyanate compound may be a blocked isocyanate compound (a compound in which an isocyanate group is protected with a blocking agent).

The glass transition temperature (Tg) of the non-crystalline resin is preferably 50° C. or more and 80° C. or less, more preferably 50° C. or more and 65° C. or less.

The glass transition temperature is determined from a DSC curve obtained by differential scanning calorimetry (DSC) in accordance with "extrapolated glass transition onset temperature" described in the method for obtaining a glass transition temperature in JIS K 7121:1987 "Testing methods for transition temperatures of plastics".

The weight-average molecular weight (Mw) of the non-crystalline resin is preferably 5,000 or more and 1 million or less, and more preferably 7,000 or more and 500,000 or less.

The number-average molecular weight (Mn) of the non-crystalline resin is preferably 2,000 or more and 100,000 or less.

The molecular weight distribution Mw/Mn of the non-crystalline resin is preferably 1.5 or more and 100 or less and more preferably 2 or more and 60 or less.

The weight-average molecular weight and the number-average molecular weight are measured through gel permeation chromatography (GPC). The measurement of molecular weight through GPC is performed by using GPC HLC-8120 manufactured by Tosoh Corporation as a measurement apparatus, a TSKgel SuperHM-M (15 cm) column manufactured by Tosoh Corporation, and a THF solvent. The weight-average molecular weight and the number-average molecular weight are calculated from the measurement results by using a molecular weight calibration curve formed from a monodisperse polystyrene standard sample.

—Method for Synthesizing Hybrid Resin—

The hybrid resin is not limited as long as it is a polymer having a structure in which a crystalline polyester resin unit and a non-crystalline resin unit are chemically bonded to each other, and a commercially available product or a synthesized product may be used. The following methods are examples of a specific method for synthesizing the hybrid resin.

(1) Method for Synthesizing the Hybrid Resin by Polymerizing a Non-Crystalline Resin Unit in Advance and Performing a Polymerization Reaction to Form a Crystalline Polyester Resin Unit in the Presence of the Non-Crystalline Resin Unit In this method, first, monomers constituting the non-crystalline resin unit described above are polymerized to form a non-crystalline resin unit. Next, a polyhydric carboxylic acid and a polyhydric alcohol are subjected to a polymerization reaction in the presence of the non-crystalline resin unit to form a crystalline polyester resin unit. At this time, the polyhydric carboxylic acid and the polyhydric alcohol are subjected to a condensation reaction, and also the polyhydric carboxylic acid or the polyhydric alcohol is subjected to an addition reaction relative to the non-crystalline resin unit, whereby a hybrid resin is synthesized.

In the method described above, it is preferable that the crystalline polyester resin unit or the non-crystalline resin unit has a part where these units react with each other. Specifically, in the formation of the non-crystalline resin unit, a compound having a part reactive with a carboxy group or a hydroxyl group remaining in the crystalline polyester resin unit and a part reactive with the non-crystalline resin unit may also be used in addition to the monomers constituting the non-crystalline resin unit. That is, this compound reacts with a carboxy group or a hydroxyl group in the crystalline polyester resin unit to cause the crystalline polyester resin unit to chemically bond to the non-crystalline resin unit.

Using the method described above allows a hybrid resin having a structure in which a crystalline polyester resin unit is chemically bonded to a non-crystalline resin unit to be synthesized.

(2) Method for Synthesizing the Hybrid Resin by Forming a Crystalline Polyester Resin Unit and a Non-Crystalline Resin Unit and Bonding Them In this method, first, a polyhydric carboxylic acid and a polyhydric alcohol are subjected to a condensation reaction to form a crystalline polyester resin unit. Separately from the reaction system for forming the crystalline polyester resin unit, the monomers constituting the non-crystalline resin unit described above are polymerized to form the non-crystalline resin unit. At this time, it is preferable to have a part where the crystalline polyester resin unit and the non-crystalline resin unit react with each other. As the method of incorporating a part where both units react with each other, a similar method to the method (1) described above may be used.

Next, the crystalline polyester unit formed as described above is reacted with the non-crystalline resin unit, whereby a hybrid resin having a structure in which the crystalline polyester resin unit and the non-crystalline resin unit are chemically bonded is synthesized.

When the crystalline polyester resin unit and the non-crystalline resin unit have no reactive part where the units react with each other, a system in which the crystalline polyester resin unit and the non-crystalline resin unit coexist may be prepared, and a compound having a part capable of bonding to the crystalline polyester resin unit and the non-crystalline resin unit may be introduced into the system. Then, a hybrid resin having a structure in which the crystalline polyester resin unit and the non-crystalline resin unit are chemically bonded via the compound may be synthesized.

(3) Method for Synthesizing the Hybrid Resin by Forming a Crystalline Polyester Resin Unit in Advance and Carrying Out a Polymerization Reaction to Form a Non-crystalline Resin Unit in the Presence of the Crystalline Polyester Resin Unit In this method, first, a polyhydric carboxylic acid and a polyhydric alcohol are subjected to a condensation reaction for polymerization to form a crystalline polyester resin unit. Next, in the presence of the crystalline polyester resin unit, monomers constituting the non-crystalline resin unit are subjected to a polymerization reaction to form the non-crystalline resin unit. At this time, as in the method (1), it is preferable that the crystalline polyester resin unit or the non-crystalline resin unit have a part where these units react with each other. As the method of incorporating a part where both units react with each other, a similar method to the method (1) described above may be used.

A hybrid resin having a structure in which the non-crystalline resin unit is chemically bonded to the crystalline polyester resin unit is formed by the method described above.

The content of the crystalline polyester resin unit relative to the hybrid resin is preferably 50 mass % or more and 98 mass % or less from the viewpoint of imparting sufficient crystallinity to the hybrid resin.

The melting temperature of the hybrid resin is preferably 50° C. or more and 100° C. or less, more preferably 55° C. or more and 90° C. or less, and still more preferably 60° C. or more and 85° C. or less.

The glass transition temperature (Tg) of the hybrid resin is preferably 50° C. or more and 80° C. or less, and more preferably 50° C. or more and 65° C. or less.

The weight-average molecular weight (Mw) of the hybrid resin is preferably 5,000 or more and 100,000 or less, more preferably 7,000 or more and 50,000 or less, and still more preferably 8,000 or more and 35,000 or less from the viewpoint of low-temperature fixability of toner.

The molecular weight distribution (Mw/Mn) of the hybrid resin is preferably 1.5 or more and 100 or less, and more preferably 2 or more and 60 or less.

The method for measuring the weight-average molecular weight is as described above.

The content of the hybrid resin relative to the entire vinyl resin is preferably 1 mass % or more and less than 50 mass %, more preferably 10 mass % or more and less than 30 mass %, and still more preferably 15 mass % or more and less than 25 mass % from the viewpoint of low-temperature fixability.

The content of the hybrid resin relative to the binder resin is preferably 5 mass % or more and less than 50 mass %, more preferably 10 mass % or more and less than 30 mass %, and still more preferably 15 mass % or more and less than 25 mass % from the viewpoint of low-temperature fixability.

The content of the unit derived from a styrene-based monomer (hereinafter also referred to as "styrene content") is preferably 40 mass % or more and 90 mass % or less, more preferably 60 mass % or more and 85 mass % or less, and still more preferably 65 mass % or more and 80 mass % or less relative to the entire toner particles.

For example, when the toner particles contain a plurality of vinyl resins (for example, a styrene (meth)acrylic resin having a crosslinked structure and a hybrid resin) as the binder resin, the styrene content refers to the total content of units derived from styrene-based monomers contained in the plurality of vinyl resins.

Containing the styrene content within the above-described range has an advantage of higher storage stability of toner than in the case where the styrene content is less than the above-described range and an advantage of better low-temperature fixability than in the case where the styrene content is more than the above-described range. When the styrene content is within the above-described range, the release agent domain diameters tend to increase. However, in the exemplary embodiment, the number average and standard deviation of the release agent domain diameters are in the above-described range, which inhibits the occurrence of fogging caused by decentering of toner particles.

The styrene content in the toner particles may be determined by identifying a styrene compound through chemical analysis, followed by quantitative analysis using NMR or by using a calibration curve of the styrene compound previously measured through liquid chromatography (LC-UV).

The binder resin includes at least a vinyl resin as described above and may optionally include a resin other than the vinyl resin.

The content of the vinyl resin relative to the entire binder resin may be 80 mass % or more and 100 mass % or less, or may be 98 mass % or more and 100 mass % or less.

Examples of the resin other than the vinyl resin include non-vinyl resins such as an epoxy resin, a polyester resin, a polyurethane resin, a polyamide resin, a cellulose resin, a polyether resin, and a modified rosin.

The content of the binder resin is, for example, preferably 40 mass % or more and 95 mass % or less, more preferably 50 mass % or more and 90 mass % or less, still more preferably 60 mass % or more and 85 mass % or less relative to the entire toner particles.

—Coloring Agent—

Examples of the coloring agent include various pigments such as carbon black, chrome yellow, hansa yellow, benzidine yellow, threne yellow, quinoline yellow, pigment yellow, permanent orange GTR, pyrazolone orange, vulcan orange, watchung red, permanent red, brilliant carmin 3B, brilliant carmin 6B, DuPont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate, and various dyes such as acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

These coloring agents may be used alone or in combination of two or more thereof.

The coloring agent may be a surface-treated coloring agent as necessary and may be used in combination with a dispersant. The coloring agent may be used in combination of two or more thereof.

The content of the coloring agent is, for example, preferably 1 mass % or more and 30 mass % or less, and more preferably 3 mass % or more and 15 mass % or less relative to the entire toner particles.

—Release Agent—

In the exemplary embodiment, the release agent includes at least an ester wax.

The ester wax is a wax having an ester bond. The ester wax may be any of a monoester, a diester, a triester, and a tetraester, and a known natural or synthetic ester wax may be employed.

Examples of the ester wax include an ester compound of a higher fatty acid (e.g. fatty acid having 10 or more carbon atoms) and a monohydric or polyhydric aliphatic alcohol (e.g. aliphatic alcohol having 8 or more carbon atoms).

Examples of the ester wax include an ester compound of a higher fatty acid (e.g. caprylic acid, capric acid, lauric acid, myristic acid, palmitic acid, stearic acid, arachidic acid, behenic acid, and oleic acid) and an alcohol (monohydric alcohol such as methanol, ethanol, propanol, isopropanol, butanol, capryl alcohol, lauryl alcohol, myristyl alcohol, cetyl alcohol, stearyl alcohol, or oleyl alcohol; or polyhydric alcohol such as glycerin, ethylene glycol, propylene glycol, sorbitol, or pentaerythritol), and specific examples thereof include carnauba wax, rice wax, candelilla wax, jojoba oil, Japan wax, beeswax, tree wax, lanolin, and montanic acid ester wax.

The release agent may include a release agent other than the ester wax as necessary.

Examples of the release agent other than the ester wax include: hydrocarbon wax; natural wax such as carnauba wax, rice wax, candelilla wax; and synthetic or mineral-petroleum wax such as montan wax and the like. The release agent other than the ester wax is not limited to these waxes.

The melting temperature of the release agent is preferably 50° C. or more and 110° C. or less, and more preferably 60° C. or more and 100° C. or less.

The melting temperature is determined from a DSC curve obtained by differential scanning calorimetry (DSC) in accordance with "melting peak temperature" described in the method for obtaining a melting temperature in JIS K 7121:1987 "Testing methods for transition temperatures of plastics".

The content of the release agent is, for example, preferably 1 mass % or more and 20 mass % or less, and more preferably 5 mass % or more and 15 mass % or less relative to the entire toner particles.

When the content of the unit derived from the monomer having a styrene skeleton relative to the entire toner particles (that is, the styrene content) is Ys mass %, and the content of the release agent relative to the entire toner particles is Yw mass %, the value of the ratio Yw/Ys is preferably 0.055 or more and 0.375 or less, more preferably 0.055 or more and 0.250 or less, and still more preferably 0.055 or more and 0.200 or less.

When the value of the ratio Yw/Ys is within the above-described range, there is an advantage in the storage stability of the toner as compared with the case where the value is larger than the above-described range, and there is an advantage in the low-temperature fixability as compared with the case where the value is smaller than the above-described range.

When the value of the ratio Yw/Ys is within the above-described range, the release agent domain diameters tend to increase. However, in the exemplary embodiment, the number-average and standard deviation of the release agent domain diameters are within the above-described range, which inhibits the occurrence of fogging caused by decentering of toner particles.

When the content of the hybrid resin relative to the entire toner particles is Yh mass % and the content of the release agent relative to the entire toner particles is Yw mass %, the value of the ratio Yw/Yh is preferably 0.25 or more and 15 or less, more preferably 0.50 or more and 5.0 or less, and still more preferably 0.50 or more and 3.0 or less.

When the value of the ratio Yw/Yh is within the above-described range, there is an advantage in the low-temperature fixability as compared with the case where Yw/Yh is larger than the above-described range, and there is an advantage in the charging characteristics as compared with the case where the ratio Yw/Yh is smaller than the above-described range.

When the value of the ratio Yw/Yh is within the above-described range, the release agent domain diameter tends to increase. However, in this exemplary embodiment, the number-average and standard deviation of the release agent domain diameters are within the above-described range, which inhibits the occurrence of fogging caused by decentering of toner particles.

—Surfactant—

The toner particles may contain a surfactant. Examples of the surfactant contained in the toner particles include a surfactant that is used to disperse particles in a dispersion in the process of producing the toner particles, the surfactant remaining in the toner particles.

In particular, toner particles in which the distribution of the release agent domain diameters is controlled by the above-described opposite polarity surfactant method contain, for example, both a cationic surfactant and an anionic surfactant.

Examples of the cationic surfactant include: amine acetates such as octadecylamine acetate and tetradecylamine acetate; methylammonium salt acid salts such as lauryltrimethylammonium chloride, tallowtrimethylammonium chloride, cetyltrimethylammonium chloride, stearyltrimethylammonium chloride, behenyltrimethylammonium chloride, di stearyldimethylammonium chloride, and didecyldimethylammonium chloride; benzyl chlorides such as octadecyldimethylbenzylammonium chloride and tetradecyldimethylbenzylammonium chloride; and quaternary ammonium salts such as dioleyldimethylammonium chloride and tetrabutylammonium bromide.

Of these cationic surfactants, a quaternary ammonium salt or a methylammonium acid salt is preferable, and a quaternary ammonium salt is more preferably from the viewpoint of toner granulation.

Examples of the anionic surfactant include: sulfonates in which at least one of an alkyl group or a phenyl group is substituted with a sulfonate, such as sodium dodecyl benzene sulfonate and sodium alkyl diphenyl ether disulfonate; metal soaps such as lithium stearate, magnesium stearate, calcium stearate, barium stearate, zinc stearate, calcium ricinoleate, barium ricinoleate, zinc ricinoleate, and zinc octanoate; and alkyl sulfuric acid esters such as sodium lauryl sulfate, potassium lauryl sulfate, sodium myristyl sulfate, and sodium cetyl sulfate.

Of these anionic surfactants, a sulfonate or a metal soap is preferable, and a sulfonate is more preferable from the viewpoint of imparting charges in friction.

Examples of a combination of the cationic surfactant and the anionic surfactant include a combination of a quaternary ammonium salt and a sulfonate, a combination of a methylammonium salt acid salt and a sulfonate, and a combination of a methylammonium salt acid salt and a metal soap. Of them, a combination of a quaternary ammonium salt and a sulfonate is preferable.

—Other Additives—

Examples of the other additives include well-known additives such as magnetic substances, charge control agents, and inorganic powders. These additives are contained in toner particles as internal additives.

—Characteristics, etc. of Toner Particle—

The toner particles may be toner particles having a single-layer structure or may be toner particles having a so-called core-shell structure including a core part (core particle) and a coating layer (shell layer) covering the core part.

Here, the toner particles having a core-shell structure may include, for example, a core part containing a binder resin and other additives such as a coloring agent and a release agent as necessary, and a coating layer containing a binder resin and a release agent as necessary.

That is, in the toner particles having a core-shell structure, at least one of the core part and the coating layer may contain a release agent. The toner particles having a core-shell structure may have, for example, a core part containing a binder resin and no release agent and a coating layer containing a binder resin and a release agent, a core part containing a binder resin and a release agent and a coating layer containing a binder resin and no release agent, or a core part containing a binder resin and a release agent and a coating layer containing a binder resin and a release agent.

When the coating layer contains a release agent, another coating layer containing a binder resin and no release agent may be further provided. The other coating layer may be provided on the outer peripheral surface, the inner peripheral surface, or both the outer peripheral surface and the inner peripheral surface of the coating layer containing a release agent.

The volume-average particle diameter (D50v) of the toner particles is preferably 2 μm or more and 10 μm or less, more preferably 4 μm or more and 8 μm or less, and still more preferably 5 μm or more and 7 μm or less.

The average particle diameter and the particle size distribution indexes of the toner particles are measured with Coulter Multisizer II (manufactured by Beckman Coulter, Inc.) using ISOTON-II (manufactured by Beckman Coulter, Inc.) as an electrolytic solution.

In the measurement, 0.5 mg or more and 50 mg or less of a measurement sample is added to 2 ml of a 5% aqueous solution of a surfactant (sodium alkylbenzene sulfonate is preferable) as a dispersant. The mixture is added to 100 ml or more and 150 ml or less of the electrolytic solution.

The electrolytic solution in which the sample is suspended is subjected to a dispersion treatment for 1 minute with an ultrasonic disperser, and the particle size distribution of particles having a particle diameter of 2 μm or more and 60 μm or less is measured with a Coulter Multisizer II using an aperture having an aperture diameter of 100 μm. The number of sampled particles is 50,000.

The volume-based cumulative distribution and number-based cumulative distribution of the particle diameter are drawn from the smaller diameter side for the particle size ranges (channels) divided based on the measured particle size distribution, in which a particle diameter at a cumulative percentage of 16% is defined as a volume-average particle diameter D16v and a number-average particle diameter D16p, a particle diameter at a cumulative percentage of 50% is defined as a volume-average particular diameter D50v and a number-average particle diameter D50p, and a particle diameter at a cumulative percentage of 84% is defined as a volume-average particular diameter D84v and a number-average particle diameter D84p.

Using these values, the volume-average particle size distribution index (GSDv) is calculated as $(D84v/D16v)^{1/2}$, and the number-average particle size distribution index (GSDp) is calculated as $(D84p/D16p)^{1/2}$.

The average circularity of the toner particles is preferably 0.94 or more and 1.00 or less, and more preferably 0.95 or more and 0.98 or less.

The average circularity of the toner particles is obtained from (circle equivalent circumference)/(circumference) [(circumference of circle having the same projected area as particle image)/(circumference of projected particle image)]. Specifically, the average circularity of the toner particles is a value measured by the following method.

First, the toner particles to be measured are collected by suction to form a flat flow, and their particle image is captured as a still image with instantaneous stroboscopic flash. The particle image is analyzed with a flow particle image analyzer (FPIA-3000 manufactured by Sysmex Corporation). The number of samples used to obtain the average circularity is 3,500.

When the toner has an external additive, the toner (developer) to be measured is dispersed in water containing a surfactant and then subjected to ultrasonic treatment to obtain toner particles from which the external additive has been removed.

(External Additive)

Examples of the external additive include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)n$, $Al_2O_3 \cdot 2SiO_2$, $CaCO_3$, $MgCO_3$, $BaSO_4$, and $MgSO_4$.

The surfaces of the inorganic particles as the external additive are preferably subjected to a hydrophobization treatment. The hydrophobization treatment is performed, for example, by immersing the inorganic particles in a hydrophobizing agent. Examples of the hydrophobizing agent include, but not limited to, a silane coupling agent, a silicone oil, a titanate coupling agent, and an aluminum coupling agent. These hydrophobizing agents may be used alone or in combination of two or more thereof.

The amount of hydrophobizing agent is typically, for example, 1 part by mass or more and 10 parts by mass or less per 100 parts by mass of the inorganic particles.

Examples of the external additive include resin particles (resin particles such as polystyrene, polymethyl methacrylate (PMMA), and a melamine resin) and a cleaning activator (e.g., metal salts of higher fatty acids typified by zinc stearate, and fluorinated polymer particles).

The amount of the external additive externally added is, for example, preferably 0.01 mass % or more and 5 mass % or less and more preferably 0.01 mass % or more and 2.0 mass % or less relative to the toner particles.

(Method for Producing Toner)

Next, a method for producing toner according to an exemplary embodiment will be described.

The toner according to the exemplary embodiment is obtained by externally adding an external additive to toner particles as necessary after the toner particles are produced.

The toner particles may be produced by either a dry method (e.g., kneading-pulverization method) or a wet method (e.g., aggregation-coalescence method, suspension-polymerization method, or dissolution-suspension method). The method for producing toner particles is not limited to these methods, and any known production method is employed.

Of these methods, an aggregation-coalescence method is preferably used to obtain toner particles.

Specifically, for example, when the toner particles are produced by an aggregation-coalescence method, the toner particles are produced through a step of preparing a resin particle dispersion in which resin particles to be a binder resin are dispersed and a release agent particle dispersion in which release agent particles are dispersed (dispersion preparation step), a step of aggregating the resin particles (and other particles as necessary) in the resin particle dispersion (in the dispersion after mixing other particle dispersion as necessary) to form aggregated particles (aggregated particle forming step), and a step of heating the aggregated particle dispersion in which aggregated particles are dispersed, causing fusion and coalesce of the aggregated particles to form toner particles (fusion-coalescence step).

Hereinafter, details of each step will be described.

In the following description, a method for obtaining toner particles containing a coloring agent and a release agent will be described, but the coloring agent is used as necessary. Of course, other additives other than the coloring agent may be used.

—Dispersion Preparation Step—

First, in addition to a resin particle dispersion in which resin particles serving as a binder resin are dispersed, for example, a coloring agent particle dispersion in which coloring agent particles are dispersed and a release agent particle dispersion in which release agent particles are dispersed are prepared.

The resin particle dispersion is prepared, for example, by dispersing resin particles in a dispersion medium using a surfactant.

Examples of the dispersion medium used for the resin particle dispersion include an aqueous medium.

Examples of the aqueous medium include water such as distilled water and ion-exchanged water, and alcohols. These aqueous media may be used alone or in combination of two or more thereof.

Examples of the surfactant include: anionic surfactants such as sulfate surfactants, sulfonate surfactants, phosphate surfactants, and soap surfactants; cationic surfactants such as amine salt surfactants and quaternary ammonium salt surfactants; nonionic surfactants such as polyethylene glycol surfactants, alkylphenol ethylene oxide adduct surfactants, and polyhydric alcohol surfactants. Of these surfactants, in particular, anionic surfactants and cationic surfactants may be used. The nonionic surfactant may be used in combination with an anionic surfactant or a cationic surfactant.

The surfactants may be used alone, or in combination of two or more thereof may be used in combination.

Examples of a method for dispersing resin particles in a dispersion medium to prepare the resin particle dispersion includes common dispersion methods that use a rotary shear homogenizer or a mill containing media such as a ball mill, a sand mill, or a Dyno-Mill. Depending on the type of resin particles, the resin particles may be dispersed in the resin particle dispersion by, for example, a phase-inversion emulsification method.

The phase-inversion emulsification method is a method for dispersing a resin in the form of particles in an aqueous medium. This method includes dissolving a target resin in a hydrophobic organic solvent capable of dissolving the resin, adding a base to the organic continuous phase (O phase) to cause neutralization, and then adding an aqueous medium (W phase) to cause conversion of the resin from W/O to O/W (so-called phase inversion) to form a discontinuous phase.

The volume-average particle diameter of the resin particles dispersed in the resin particle dispersion is, for example, preferably 0.01 μm or more and 1 μm or less, more preferably 0.08 μm or more and 0.8 μm or less, and still more preferably 0.1 μm or more and 0.6 μm or less.

The volume-average particle diameter of the resin particles is measured as follows: drawing the volume-based cumulative distribution in divided particle size ranges (channels) from the smaller particle diameter side using the particle size distribution obtained by measurement with a laser diffraction particle size distribution analyzer (for example, LA-700 manufactured by HORIBA, Ltd.); and defining the particle diameter at a cumulative percentage of 50% relative to all particles as a volume average particle diameter D50v. The volume-average particle diameter of particles in other dispersions is measured in the same manner.

The content of the resin particles contained in the resin particle dispersion is, for example, preferably 5 mass % or more and 50 mass % or less, and more preferably 10 mass % or more and 40 mass % or less.

Similarly to the resin particle dispersion, for example, a coloring agent particle dispersion and a release agent particle dispersion are also prepared. That is, the volume-average particle diameter of the particles, the dispersion medium, the dispersion method, and the content of the particles in the resin particle dispersion are the same as those of the coloring agent particles dispersed in the coloring agent particle dispersion and the release agent particles dispersed in the release agent particle dispersion.

Here, in the opposite polarity surfactant method, for example, an anionic surfactant is used as a surfactant to be contained in the resin particle dispersion, and a cationic surfactant is used as a surfactant to be contained in the release agent particle dispersion.

Alternatively, a cationic surfactant may be used as a surfactant to be contained in the resin particle dispersion, and an anionic surfactant may be used as a surfactant to be contained in the release agent particle dispersion.

As described above, it is presumed that using a surfactant having a polarity opposite to the polarity of the surfactant used in the resin particle dispersion as the surfactant used in the release agent particle dispersion inhibits aggregation of the release agent particles in the aggregated particle forming step described later, whereby the number average of the release agent domain diameters, the standard deviation of the release agent domain diameters, and the large-diameter domain proportion are controlled within the above-described ranges.

—Aggregated Particle Forming Step—

Next, the resin particle dispersion is mixed with the coloring agent particle dispersion and the release agent particle dispersion.

The resin particles, the coloring agent particles, and the release agent particles cause heteroaggregation in the mixture dispersion to form aggregated particles having a diameter close to the intended toner particle diameter and containing the resin particles, the coloring agent particles, and the release agent particles.

Specifically, the aggregated particles are formed for example by adding a flocculant to the mixture dispersion, adjusting the pH of the mixture dispersion to be acidic (for example, the pH is 2 or more and 5 or less), adding a dispersion stabilizer as necessary, thereafter heating the mixture to a temperature close the glass transition temperature of the resin particles (specifically, for example, the glass transition temperature of the resin particles minus 30° C. or more and minus 10° C. or less) to cause aggregation of the particles dispersed in the mixture dispersion.

The aggregated particle forming step may include, for example, adding the flocculant to the mixture dispersion at room temperature (e.g., 25° C.) under stirring with a rotary shear homogenizer and adjusting the pH of the mixture dispersion to the acid side (e.g., a pH of 2 or more and 5 or less), and heating the mixture dispersion after addition of a dispersion stabilizer as necessary.

As described above, in the aggregated particle forming step, the number average of release agent domains, the standard deviation of the release agent domain diameters, and the large-diameter domain proportion may be controlled by adjusting the stirring speed.

Examples of the flocculant include a surfactant having a polarity opposite to the polarity of the surfactant used as the dispersant to be added to the mixture dispersion, an inorganic metal salt, and a dihydric or higher metal complex. The use of a metal complex as the flocculant reduces the use amount of the surfactant and improves the charging characteristics.

The flocculant may be used in combination with an additive that forms a complex or similar bond with metal ions of the flocculant agent as necessary. As the additive, a chelating agent is suitably used.

Examples of inorganic metal salt include metal salts such as calcium chloride, calcium nitrate, barium chloride, magnesium chloride, zinc chloride, aluminum chloride, and aluminum sulfate, and inorganic metal salt polymers such as polyaluminum chloride, polyaluminum hydroxide, and calcium polysulfide.

The chelating agent may be a water-soluble chelating agent. Examples of the chelating agent include oxycarboxylic acids such as tartaric acid, citric acid, and gluconic acid, iminodiacetic acid (IDA), nitrilotriacetic acid (NTA), and ethylene diamine tetraacetic acid (EDTA).

The addition amount of the chelating agent is, for example, preferably 0.01 parts by mass or more and 5.0 parts by mass or less and more preferably 0.1 parts by mass or more and less than 3.0 parts by mass relative to 100 parts by mass of the resin particles.

—Fusion-Coalescence Step—

Next, the aggregated particle dispersion in which the aggregated particles are dispersed is heated to, for example, a temperature equal to or higher than the glass transition temperature of the resin particles (for example, a temperature higher than the glass transition temperature of the resin particles by 10° C. to 30° C.) to cause fusion and coalescence of the aggregated particles and thus to form toner particles.

The toner particles are obtained through the above-described steps.

The toner particles may also be produced through the following steps: a step of, after obtaining an aggregated particle dispersion in which aggregated particles are dispersed, further mixing the aggregated particle dispersion with a resin particle dispersion in which resin particles are dispersed, to cause aggregation such that the resin particles adhere to the surfaces of the aggregated particles and thus to form aggregated particles, and a step of heating the aggregated particle dispersion in which the aggregated particles are dispersed to cause fusion and coalescence of the aggregated particles and thus to form toner particles having a core-shell structure.

That is, the toner particles may be produced through, for example: a dispersion preparation step; a first aggregated particle forming step of forming first aggregated particles by causing aggregation of resin particles (and other particles as necessary) in a resin particle dispersion (in a dispersion after mixing of other particle dispersion as necessary); a second aggregated particle forming step of further mixing the first aggregated particle dispersion in which the first aggregated particles are dispersed and a resin particle dispersion in which resin particles are dispersed, to cause aggregation such that the resin particles further adhere to the surfaces of the first aggregated particles and thus to form second aggregated particles; and a fusion-coalescence step of heating the second aggregated particle dispersion in which the second aggregated particles are dispersed to cause fusion and coalescence of the second aggregated particles and thus to form toner particles having a core-shell structure including a core part and a coating layer.

The second aggregated particle forming step may be a step including further mixing the first aggregated particle dispersion in which the first aggregated particles are dispersed, the resin particle dispersion in which the resin particles are dispersed, and the release agent particle dispersion in which the release agent particles are dispersed, to cause aggregation such that the resin particles and the release agent particles further adhere to the surfaces of the first aggregated particles and thus to form the second aggregated particles.

The toner particles may also be produced through a step of, after obtaining the second aggregated particle dispersion in which the second aggregated particles are dispersed, further mixing the second aggregated particle dispersion with a resin particle dispersion in which resin particles are dispersed, to cause aggregation such that the resin particles further adhere to the surfaces of the second aggregated particles and thus to form third aggregated particles, and heating the third aggregated particle dispersion in which the third aggregated particles are dispersed, to cause fusion and coalescence of the third aggregated particles and thus to form toner particles having a core part, a first coating layer, and a second coating layer.

After completion of the fusion-coalescence step, the toner particles formed in the solution are subjected to known washing step, solid-liquid separation step, and drying step to obtain toner particles in a dried state.

The washing step preferably includes sufficient displacement washing with ion-exchanged water from the viewpoint of chargeability. The solid-liquid separation step is not limited but preferably includes suction filtration, pressure filtration, or the like in view of productivity. The drying step is not limited either but preferably includes, for example, freeze-drying, flash drying, fluidized drying, or vibration fluidized drying from the viewpoint of productivity.

The toner according to the exemplary embodiment is produced by, for example, adding an external additive to the obtained toner particles in a dried state. The mixing may be performed with, for example, a V blender, a Henschel mixer, or a Loedige mixer. Coarse particles in the toner may be removed with a vibratory screening machine, a wind-power screening machine, or the like as necessary.

<Electrostatic Charge Image Developer>

An electrostatic charge image developer according to the exemplary embodiment includes at least the toner according to the exemplary embodiment.

The electrostatic charge image developer according to the exemplary embodiment may be a one-component developer containing only the toner according to the exemplary embodiment or may be a two-component developer in which the toner and a carrier are mixed.

The carrier is not limited, and a known carrier may be used. Examples of the carrier include: a coated carrier including a core material made of magnetic powder and a coating resin that covers the surface of the core material; a magnetic powder-dispersed carrier in which a magnetic powder is dispersed and blended in matrix resin; and a resin-impregnated carrier in which porous magnetic powder is impregnated with resin.

The magnetic powder-dispersed carrier and the resin-impregnated carrier may be carriers in which the surfaces of carrier-forming particles serving as core materials are coated with resin.

Examples of the magnetic powder include powders made of magnetic metal such as iron, nickel, or cobalt, and powders made of magnetic oxide such as ferrite or magnesium.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin having an organosiloxane bond or a modified product thereof, a fluororesin, polyester, polycarbonate, phenolic resin, and epoxy resin.

The coating resin and the matrix resin may contain other additives such as conductive particles.

Examples of conductive particles include particles made of metal such as gold, silver, or copper, carbon black, titanium oxide, zinc oxide, tin oxide, barium sulfate, aluminum borate, and potassium titanate.

To coat the surface of the core material with a coating resin, for example, a coating method using a coating layer forming solution in which the coating resin and various additives as necessary are dissolved in an appropriate solvent may be used. The solvent is not limited and may be selected in consideration of the coating resin to be used, suitability to coating, and the like.

Specific examples of the resin coating method include an immersion method including immersing a core material in a coating layer forming solution, a spray method including spraying a coating layer forming solution to the surface of a core material, a fluidized bed method including spraying a coating layer forming layer while a core material is floating in air flow, and a kneader-coater method including mixing a core material of a carrier and a coating layer forming solution in a kneader-coater and then removing a solvent.

The mixing ratio (mass ratio) between the toner and the carrier in the two-component developer is preferably toner: carrier=1:100 to 30:100, and more preferably 3:100 to 20:100.

<Image Forming Apparatus, Image Forming Method>

Next, an image forming apparatus and an image forming method according to exemplary embodiments will be described.

The image forming apparatus according to the exemplary embodiment includes an image holding member, a charging unit that charges the surface of the image holding member, an electrostatic charge image forming unit that forms an electrostatic charge image on the charged surface of the image holding member, a developing unit that contains an electrostatic charge image developer and develops, as a toner image, the electrostatic charge image formed on the surface of the image holding member by using the electrostatic charge image developer, a transfer unit that transfers the toner image formed on the surface of the image holding member onto a surface of a recording medium, and a fixing unit that fixes the toner image transferred onto the surface of the recording medium. The electrostatic charge image developer according to the present embodiment is used as the electrostatic charge image developer.

An image forming method (the image forming method according to the exemplary embodiment) is carried out in the image forming apparatus according to the exemplary embodiment, the method including a charging step of charging the surface of the image holding member, an electrostatic charge image forming step of forming an electrostatic charge image on the charged surface of the image holding member, a developing step of developing the electrostatic charge image formed on the surface of the image holding member by using the electrostatic charge image developer according to the exemplary embodiment to form a toner image, a transfer step of transferring the toner image formed on the surface of the image holding member onto a surface of a recording medium, and a fixing step of fixing the toner image transferred onto the surface of the recording medium.

The image forming apparatus according to the exemplary embodiment may be a known image forming apparatuses such as: a direct transfer apparatus that directly transfers a toner image formed on the surface of an image holding member onto a recording medium; an intermediate transfer apparatus that primarily transfers a toner image formed on the surface of an image holding member onto the surface of an intermediate transfer body and secondarily transfers the toner image transferred onto the surface of the intermediate transfer body onto a surface of a recording medium; an apparatus including a cleaning unit that cleans the surface of an image holding member before charging after transfer of a toner image; and an apparatus including a charge eliminating unit that eliminates charges by irradiating the surface of an image holding member with charge eliminating light before charging after transfer of a toner image.

In the intermediate transfer apparatus, the transfer unit may include, for example, an intermediate transfer body onto which a toner image is to be transferred, a primary transfer unit that primarily transfers the toner image on the surface of the image holding member onto the surface of the intermediate transfer body, and a secondary transfer unit that secondarily transfers the toner image on the surface of the intermediate transfer body onto a surface of a recording medium.

In the image forming apparatus according to the exemplary embodiment, for example, a part including the developing unit may have a cartridge structure (process cartridge) detachably attached to an image forming apparatus. As the process cartridge, for example, a process cartridge including a developing unit that contains the electrostatic charge image developer according to the exemplary embodiment is suitably used.

Hereinafter, an example of the image forming apparatus according to the exemplary embodiment will be described, but the image forming apparatus is not limited to this example. Main parts illustrated in the drawings will be described, and description of other parts will be omitted.

FIG. 1 is a schematic diagram illustrating the image forming apparatus according to the exemplary embodiment.

The image forming apparatus illustrated in FIG. 1 includes first to fourth electrophotographic image forming units 10Y, 10M, 10C, and 10K (image forming units) that respectively output yellow (Y), magenta (M), cyan (C), and black (K) color images based on color-separated image data. The image forming units (hereinafter may also be simply referred to as "units") 10Y, 10M, 10C, and 10K are arranged apart from each other at predetermined intervals in the horizontal direction. The units 10Y, 10M, 10C, and 10K may be process cartridges detachably attached to an image forming apparatus.

An intermediate transfer belt 20 as the intermediate transfer body is disposed above the units 10Y, 10M, 10C, and 10K in the drawing through the units. The intermediate transfer belt 20 is wound around a drive roller 22 and a support roller 24 that are disposed apart from each other in the direction from the left to the right of the drawing and are in contact with the inner surface of the intermediate transfer belt 20. The intermediate transfer belt runs in the direction from the first unit 10Y to the fourth unit 10K. A force is applied to the support roller 24 in a direction away from the drive roller 22 with a spring or the like (not illustrated), so that a tension is applied to the intermediate transfer belt 20 wound around the two rollers. On the image holding surface side of the intermediate transfer belt 20, an intermediate transfer body cleaning device 30 is provided facing the drive roller 22.

Developing devices (developing units) 4Y, 4M, 4C, and 4K of the units 10Y, 10M, 10C, and 10K are respectively supplied with yellow, magenta, cyan, and black toners contained in toner cartridges 8Y, 8M, 8C, and 8K.

Since the first to fourth units 10Y, 10M, 10C, and 10K have the same structure, the first unit 10Y disposed upstream in the running direction of the intermediate transfer belt that forms a yellow image will be described as a representative example. The second to fourth units 10M, 10C, and 10K are assigned with references of magenta (M), cyan (C), and black (K) instead of yellow (Y) in the same parts as in the first unit 10Y, and the description thereof is omitted.

The first unit 10Y has a photoreceptor 1Y as the image holding member. The photoreceptor 1Y is surrounded by, in sequence, a charging roller (an example of the charging unit) 2Y that charges the surface of the photoreceptor 1Y to a predetermined potential, an exposure device (an example of the electrostatic charge image forming unit) 3 that exposes the charged surface to a laser beam 3Y based on a color-separated image signal to form an electrostatic charge image, a developing device (an example of the developing unit) 4Y that supplies charged toner to the electrostatic charge image to develop the electrostatic charge image, a primary transfer roller (an example of the primary transfer unit) 5Y that transfers the developed toner image onto the intermediate transfer belt 20, and a photoreceptor cleaning device (an example of the cleaning unit) 6Y that removes toner remaining on the surface of the photoreceptor 1Y after the primary transfer.

The primary transfer roller 5Y is disposed on the inner side of the intermediate transfer belt 20 to face the photoreceptor 1Y. The primary transfer rollers 5Y, 5M, 5C, and 5K are connected to respective bias power supplies (not illustrated) that apply a primary transfer bias. Each bias power supply varies a transfer bias to be applied to each primary transfer roller under the control of a control unit (not illustrated).

Hereinafter, an operation of the first unit 10Y in forming a yellow image will be described.

First, prior to the operation, the charging roller 2Y charges the surface of the photoreceptor 1Y to a potential of −600 V to −800 V.

The photoreceptor 1Y includes a conductive (for example, a volume resistivity of $1\times10^{-6}$ Ω·cm or less at 20° C.) base material and a photosensitive layer stacked on the base material. The photosensitive layer usually has high resistance (resistance of a common resin), but irradiation with the laser beam 3Y changes the specific resistance of a region of the photosensitive layer irradiated with the laser beam. For this, the charged surface of the photoreceptor 1Y is irradiated with the laser beam 3Y through the exposure device 3 according to image data for yellow sent from the control unit (not illustrated). The irradiation of the photosensitive layer on the surface of the photoreceptor 1Y with the laser beam 3Y causes an electrostatic charge image with a yellow image pattern to form on the surface of the photoreceptor 1Y.

The electrostatic charge image is an image formed on the surface of the photoreceptor 1Y through charging, and it is a so-called negative latent image formed when the specific resistance of an irradiated part of the photosensitive layer is reduced by the laser beam 3Y, charges on the surface of the photoreceptor 1Y flow, and charges in a part that is not irradiated with the laser beam 3Y remain.

The electrostatic charge image formed on the photoreceptor 1Y rotates up to a predetermined developing position as the photoreceptor 1Y runs. At this developing position, the electrostatic charge image on the photoreceptor 1Y is developed and visualized (becomes a developed image) as a toner image by the developing device 4Y.

The developing device 4Y contains, for example, an electrostatic charge image developer containing at least yellow toner and a carrier. The yellow toner is triboelectrically charged by being stirred in the developing device 4Y, and has a charge of the same polarity (negative polarity) as that charged on the photoreceptor 1Y and is held on a developer roller (an example of a developer holding member). As the surface of the photoreceptor 1Y passes through the developing device 4Y, the yellow toner electrostatically adheres to the charge-eliminated latent image part on the surface of the photoreceptor 1Y, and a latent image is developed by the yellow toner. The photoreceptor 1Y on which the yellow toner image is formed continuously runs at a predetermined speed to convey the developed toner image on the photoreceptor 1Y to a predetermined primary transfer position.

When the yellow toner image on the photoreceptor 1Y is conveyed to the primary transfer position, a primary transfer bias is applied to the primary transfer roller 5Y, an electrostatic force from the photoreceptor 1Y toward the primary transfer roller 5Y acts on the toner image, and the toner image on the photoreceptor 1Y is transferred onto the intermediate transfer belt 20. The transfer bias applied at this time has (+) polarity opposite to the polarity (−) of the toner. The transfer bias is controlled to, for example, +10 μA in the first unit 10Y by the control unit (not illustrated).

The toner remaining on the photoreceptor 1Y is removed and collected by the photoreceptor cleaning device 6Y.

The primary transfer biases applied to the primary transfer rollers 5M, 5C, and 5K in the second unit 10M and the subsequent units are also controlled in the same manner as in the first unit.

In this manner, the intermediate transfer belt 20 on which the yellow toner image has been transferred in the first unit 10Y is sequentially conveyed through the second to fourth units 10M, 10C, and 10K, and the toner images of the respective colors are multiply transferred in a superimposed manner.

The intermediate transfer belt 20 onto which the toner images of the four colors have been multiply transferred through the first to fourth units reaches a secondary transfer part including the intermediate transfer belt 20, the support roller 24 in contact with the inner surface of the intermediate transfer belt 20, and a secondary transfer roller (an example of the secondary transfer unit) 26 provided on the image holding surface side of the intermediate transfer belt. A recording paper (an example of the recording medium) P is fed to a gap between the secondary transfer roller 26 and the intermediate transfer belt 20, which are in contact with each other through a supply mechanism at a predetermined timing, and a secondary transfer bias is applied to the support roller 24. The transfer bias applied at this time has the same polarity (−) as the polarity (−) of the toner. An electrostatic force from the intermediate transfer belt 20 toward the recording paper P acts on the toner image, whereby the toner image on the intermediate transfer belt 20 is transferred onto the recording paper P. The secondary transfer bias at this time is determined according to the resistance detected by a resistance detection unit (not illustrated) that detects the resistance of the secondary transfer part. The secondary transfer bias is voltage controlled.

After this, the recording paper P is sent to a pressure contact part (nip part) between a pair of fixing rollers in a fixing device (an example of the fixing unit) 28, and the toner image is fixed to the recording paper P to form a fixed image.

Examples of the recording paper P onto which the toner image is transferred include plain paper used in electrophotographic copying machines, printers, and the like. Examples of the recording medium include OHP sheets in addition to the recording paper P.

To further improve the smoothness of the image surface after fixing, the recording paper P preferably has a smooth surface, and for example, coated paper obtained by coating the surface of plain paper with a resin or the like and art paper for printing are suitably used.

The recording paper P to which the color image has been fixed is sent toward an ejection part, and a series of color image forming operations ends.

<Process Cartridge, Toner Cartridge>

A process cartridge according to an exemplary embodiment will be described.

The process cartridge according to the exemplary embodiment is a process cartridge including a developing unit that contains the electrostatic charge image developer according to the exemplary embodiment and develops, as a toner image, an electrostatic charge image formed on the surface of an image holding member by using the electrostatic charge image developer. The process cartridge according to the exemplary embodiment is detachably attached to an image forming apparatus.

The process cartridge according to the exemplary embodiment is not limited to the above-described configuration, and may have a configuration including a developing device and, if necessary, for example at least one selected from other units, such as an image holding member, a charging unit, an electrostatic charge image forming unit, and a transfer unit.

Hereinafter, an example of the process cartridge according to the exemplary embodiment will be described, but the process cartridge is not limited to this example. Main parts illustrated in the drawings will be described, and description of other parts will be omitted.

Figure 2:
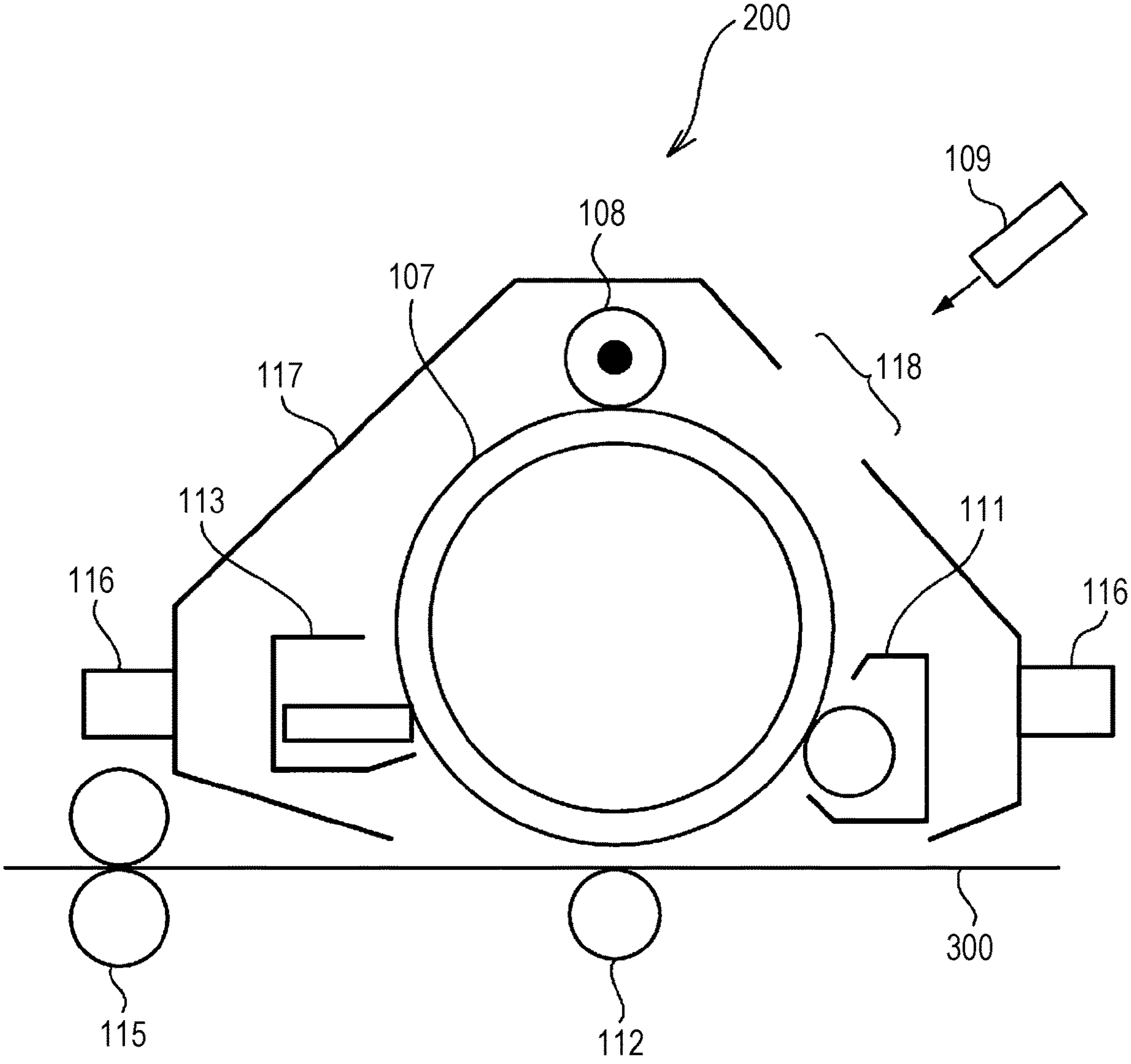
FIG. 2 is a schematic diagram illustrating an example of a process cartridge detachably attached to the image forming apparatus according to the exemplary embodiment.

FIG. 2 is a schematic diagram illustrating the process cartridge according to the exemplary embodiment.

A process cartridge 200 illustrated in FIG. 2 is a cartridge in which, for example, a photoreceptor 107 (an example of the image holding member), a charge roller 108 (an example of the charging unit) provided around the photoreceptor 107, a developing device 111 (an example of the developing unit), and a photoreceptor cleaning device 113 (an example of the cleaning unit) are integrally combined and held by a housing 117 provided with an installation rail 116 and an opening 118 for exposure.

In FIG. 2, reference 109 denotes an exposure device (an example of the electrostatic charge image forming unit), reference 112 denotes a transfer device (an example of the transfer unit), reference 115 denotes a fixing device (an example of the fixing unit), and reference 300 denotes recording paper (an example of the recording medium).

Next, a toner cartridge according to an exemplary embodiment will be described.

The toner cartridge according to the exemplary embodiment contains the toner according to the exemplary embodiment. The toner cartridge is detachably attached to an image forming apparatus. The toner cartridge contains toner for replenishment to be supplied to the developing unit in the image forming apparatus.

The image forming apparatus illustrated in FIG. 1 includes detachable toner cartridges 8Y, 8M, 8C, and 8K. The developing devices 4Y, 4M, 4C, and 4K are connected to the respective toner cartridges corresponding to the developing devices (colors) through toner supply pipes (not illustrated). When the toner contained in the toner cartridges run short, these toner cartridges are replaced.

EXAMPLES

Examples will be described below, but the present invention is not limited to these Examples at all. In the following description, all of "part" and "%" are based on mass unless otherwise specified.

[Preparation of Resin Particle Dispersion] <Preparation of Hybrid Resin Particle Dispersion A>

(Synthesis of Crystalline Polyester Resin Unit)

In a reaction vessel equipped with a stirrer, a thermometer, a nitrogen introduction tube, and a pressure reducer, 260 parts by mass of a polyhydric alcohol component (1,6-hexanediol), 460 parts by mass of a polyhydric carboxylic acid component (1,10-decanedicarboxylic acid), and 2 parts by mass of a polymerization catalyst (tin octylate) were added, and the mixture was heated to 180° C. and allowed to react at the same temperature for 10 hours while generated water under a nitrogen gas stream was distilled off. Next, the temperature of the reaction system was gradually raised to 230° C., and the reaction was performed for 5 hours while water was distilled off under a nitrogen atmosphere. Further, under a reduced pressure of 0.007 MPa or more and 0.026 MPa or less, the reaction was performed while water was distilled off, and the reaction was stopped when the acid value reached 0.1 mg KOH/g, whereby a crystalline polyester diol (crystalline polyester resin unit) was obtained.

(Synthesis of Hybrid Resin)

A mixture of 14 parts by mass of hexamethylene diisocyanate, 5 parts by mass of butyl acrylate, 4 parts by mass of acrylic acid, 17 parts by mass of styrene, and 5 parts by mass of a polymerization initiator (di-t-butyl peroxide) was put into a dropping funnel.

Next, the dropping funnel was placed on the reaction vessel described above (the reaction vessel in which the crystalline polyester diol was obtained), and the mixture was added dropwise thereto over 1 hour while the reaction system (system containing 360 parts of the crystalline polyester diol) was stirred at 160° C.

After the dropwise addition, the addition polymerization reaction was continued for 1 hour while the reaction system was maintained at 160° C. Thereafter, the temperature was raised to 200° C. and the system was held at 10 kPa for 1 hour, and then the remaining monomers and the like (acrylic acid, styrene, butyl acrylate) were removed, whereby a "hybrid resin obtained by chemically bonding a polyurethane resin and a polystyrene resin (non-crystalline resin unit) and a crystalline polyester diol (crystalline polyester resin unit): HB" was synthesized.

The weight-average molecular weight of the obtained hybrid resin was 31,000, and the melting temperature was 76° C.

(Preparation of Hybrid Resin Particle Dispersion A)

The hybrid resin: HB was dispersed using a disperser obtained by modifying Cavitron CD1010 (manufactured by Eurotec Ltd.) into a high-temperature high-pressure type. The pH was adjusted to 8.5 with ammonia at a composition ratio of 80 mass % of ion-exchanged water and 20 mass % of the hybrid resin, and the Cavitron was operated under the conditions of a rotation speed of a rotor of 60 Hz, a pressure of 5 $Kg/cm^2$, and heating with a heat exchanger at 140° C., whereby a hybrid resin particle dispersion was obtained.

The volume-average particle diameter of the hybrid resin particles in this dispersion was 120 nm. Ion-exchanged water was added to the dispersion to adjust the solid content to 20 mass %, whereby a hybrid resin particle dispersion A was obtained.

<Preparation of Styrene Acrylic Resin Particle Dispersion B>

Styrene: 77 parts
n-Butyl acrylate: 23 parts
1,10-Decanediol diacrylate: 0.4 parts
Dodecanethiol: 0.7 parts A solution obtained by dissolving 1.0 parts of an anionic surfactant (Dowfax manufactured by The Dow Chemical Company) in 60 parts of ion-exchanged water was added to a mixture obtained by mixing and dissolving the above-described materials, and the resulting mixture was dispersed and emulsified in a flask, whereby an emulsion was prepared. Subsequently, 2.0 parts of an anionic surfactant (Dowfax manufactured by The Dow Chemical Company) was dissolved in 90 parts of ion-exchanged water, 2.0 parts of the emulsion of the raw material was added thereto, and 10 parts of ion-exchanged water in which 1.0 parts of ammonium persulfate was dissolved was further added thereto. Thereafter, the remaining emulsion of the raw materials was charged over 3 hours, the air in the flask was replaced with nitrogen, and then the solution in the flask was heated to 65° C. in an oil bath while being stirred, and emulsion polymerization was continued in this state for 5 hours, whereby a polystyrene acrylic resin particle dispersion (PSA1) was obtained.

Ion-exchanged water was added to the polystyrene acrylic resin particle dispersion (PSA1) to adjust the solid content to 32 mass %, whereby a styrene acrylic resin particle dispersion B was obtained. The styrene acrylic resin particles having a crosslinked structure dispersed in the styrene acrylic resin particle dispersion B had a volume-average particle diameter of 102 nm and a weight-average molecular weight (Mw) of 57,000.

<Preparation of Non-Crystalline Polyester Resin Particle Dispersion C>

Bisphenol A ethylene oxide 2.2 mol adduct: 40 parts by mole

Bisphenol A propylene oxide 2.2 mol adduct: 60 parts by mole

Dimethyl terephthalate: 60 parts by mole

Dimethyl fumarate: 15 parts by mole

Dodecenyl succinic anhydride: 20 parts by mole

Trimellitic anhydride: 5 parts by mole

The monomer components described above other than dimethyl fumarate and trimellitic anhydride and 0.25 parts of tin dioctoate relative to 100 parts of the total of the monomer components were put into a reaction vessel equipped with a stirrer, a thermometer, a condenser, and a nitrogen gas introduction tube.

The mixture was allowed to react at 235° C. for 6 hours under a nitrogen gas stream, cooled to 200° C., mixed with dimethyl fumarate and trimellitic anhydride, and allowed to react for 1 hour. The temperature was raised to 220° C. over 5 hours, and polymerization was carried out under 10 kPa until the desired molecular weight was achieved, whereby a transparent pale yellow non-crystalline polyester resin was obtained. The non-crystalline polyester resin had a weight-average molecular weight of 35,000, a number-average molecular weight of 8,000, and a glass transition temperature of 59° C.

Next, the obtained non-crystalline polyester resin was dispersed using a disperser obtained by modifying Cavitron CD1010 (manufactured by Eurotech Ltd.) into a high-temperature high-pressure type. The pH was adjusted to 8.5 with ammonia at a composition ratio of 80 mass % of ion-exchanged water and 20 mass % of the non-crystalline polyester resin, and the Cavitron was operated under the conditions of a rotation speed of a rotor of 60 Hz, a pressure of 5 $Kg/cm^2$, and heating with a heat exchanger at 140° C., whereby a non-crystalline polyester resin dispersion (PES1) was obtained.

The non-crystalline polyester resin particles in this dispersion had a volume-average particle diameter of 130 nm. Ion-exchanged water was added to the dispersion to adjust the solid content to 20 mass %, whereby a non-crystalline polyester resin particle dispersion C was obtained.

<Preparation of Crystalline Polyester Resin Particle Dispersion D>

1,10-Decanedicarboxylic acid: 265 parts 1,6-Hexanediol: 168 parts

Dibutyltin oxide (catalyst): 0.3 parts by mass

These components were put into a heat-dried three-necked flask, thereafter the air in the flask was converted into an inert atmosphere with nitrogen gas by a decompression operation, and the mixture was stirred and refluxed at 180° C. for 5 hours by mechanical stirring. Thereafter, the mixture was gradually heated to 230° C. under reduced pressure and stirred for 2 hours. The mixture was air-cooled to terminate the reaction when the mixture became viscous. The obtained "crystalline polyester resin" had a weight-average molecular weight (Mw) of 12,700 in molecular weight measurement (in terms of polystyrene) and a melting temperature of 73° C.

The obtained crystalline polyester resin in an amount of 90 parts by mass, 1.8 parts by mass of an ionic surfactant Neogen RK (Dai-ichi Kogyo Seiyaku Co., Ltd.), and 210 parts by mass of ion-exchanged water were heated to 120° C., sufficiently dispersed with ULTRA-TURRAX T50 manufactured by IKA, and then subjected to a dispersion treatment with a pressure discharge type Gaulin homogenizer for 1 hour, whereby a crystalline polyester resin particle dispersion D having a volume-average particle diameter of 190 nm and a solid content of 20 mass % was obtained.

[Preparation of Release Agent Particle Dispersion] <Preparation of Release Agent Particle Dispersion 1>

Ester wax: 270 parts (Crobax 100-7s, Cwax=43, melting temperature: 72° C., manufactured by Nippon Seiro Co., Ltd.)

Anionic surfactant: 13.5 parts (Neogen RK, active component: 60 mass %, 3 mass % relative to the release agent, manufactured by Dai-ichi Kogyo Seiyaku Co., Ltd., sulfonate, compound name: sodium dodecyl benzene sulfonate)

Ion-exchanged water: 700 parts

These materials were mixed with each other, and the release agent was dissolved at an inner liquid temperature of 120° C. using a pressure discharge type homogenizer (Gaulin homogenizer manufactured by Gaulin). Thereafter, the obtained material was subjected to a dispersion treatment at a dispersion pressure of 5 MPa for 120 minutes and subsequently at 40 MPa for 360 minutes, and then cooled, whereby a release agent dispersion was obtained. Ion-exchanged water was added to adjust the solid content to 20 mass %, whereby a release agent particle dispersion 1 was obtained. The release agent particles in the release agent particle dispersion 1 had a volume average particle diameter of 220 nm.

<Preparation of Release Agent Particle Dispersion 2>

A release agent particle dispersion 2 was obtained in the same manner as in the release agent particle dispersion 1 except that the addition amount of the anionic surfactant was changed to 11 parts and the dispersion treatment was performed at a dispersion pressure of 5 MPa for 120 minutes and then at 40 MPa for 120 minutes. The release agent particles in the release agent particle dispersion 2 had a volume average particle diameter of 380 nm.

<Preparation of Release Agent Particle Dispersion 3>

A release agent particle dispersion 3 was obtained in the same manner as in the preparation of the release agent particle dispersion 1 except that the addition amount of the anionic surfactant was changed to 20 parts and the dispersion treatment was performed at a dispersion pressure of 5 MPa for 120 minutes and then at 40 MPa for 480 minutes. The release agent particles in the release agent particle dispersion 3 had a volume average particle diameter of 80 nm.

<Preparation of Release Agent Particle Dispersion 4>

A release agent particle dispersion 4 was obtained in the same manner as in the preparation of the release agent particle dispersion 1 except that the addition amount of the anionic surfactant was changed to 20 parts and the dispersion treatment was performed at a dispersion pressure of 5 MPa for 120 minutes and then at 55 MPa for 480 minutes. The release agent particles in the release agent particle dispersion 4 had a volume average particle diameter of 40 nm.

<Preparation of Release Agent Particle Dispersion 5>

A release agent particle dispersion 5 was obtained in the same manner as in the preparation of the release agent particle dispersion 1 except that 16 parts of a cationic surfactant (quaternary ammonium salt, manufactured by Dai-ichi Kogyo Seiyaku Co., Ltd., product name: Katiogen™) was used instead of the anionic surfactant. The release agent particles in the release agent particle dispersion 5 had a volume average particle diameter of 180 nm.

<Preparation of Release Agent Particle Dispersion 6>

A release agent particle dispersion 6 was obtained in the same manner as in the preparation of the release agent particle dispersion 1 except that the addition amount of the ester wax was changed to 200 parts, and 70 parts of a hydrocarbon wax (Fisher-Tropsch Wax, manufactured by Nippon Seiro Co., Ltd., product name: FNP0090, melting temperature Tm: 91° C.) was further added. The release agent particles in the release agent particle dispersion 6 had a volume average particle diameter of 220 nm.

[Preparation of Coloring Agent Particle Dispersion]·Carbon Black (Regal 330 Manufactured by Cabot Corporation): 250 Parts Anionic surfactant (Neogen SC, manufactured by Dai-ichi Kogyo Seiyaku Co., Ltd.): 33 parts (active component 60 mass %, 8 mass % relative to the coloring agent)

Ion-exchanged water: 750 parts

Ion-exchanged water in an amount of 280 parts and 33 parts of the anionic surfactant were put into a stainless steel container having a size with which the height of the liquid surface was about ⅓ of the height of the container when all the above materials were put into the container, the surfactant was dissolved therein, and then all the carbon black was put into the container, and the materials were stirred and defoamed using a stirrer until unwet pigment disappeared. After the mixture was defoamed, the remaining ion-exchanged water was added thereto, and the mixture was dispersed for 10 minutes at 5,000 rotations using a homogenizer (ULTRA-TURRAX T50 manufactured by IKA), and then stirred for one day with a stirrer to be defoamed. After the mixture was defoamed, the mixture was dispersed again using the homogenizer at 6,000 rotations for 10 minutes, and then stirred for one day with a stirrer to be defoamed. Subsequently, the dispersion was dispersed at a pressure of 240 MPa using a high pressure impact type disperser Ultimizer (HJP30006 manufactured by Sugino Machine Limited). The dispersion was performed corresponding to 25 passes in terms of the total charged amount and the treatment capacity of the apparatus. The obtained dispersion was allowed to stand for 72 hours to remove the precipitate, and ion-exchanged water was added thereto to adjust the solid content to 15 mass %, whereby a coloring agent particle dispersion that is a black pigment dispersion was obtained.

The coloring agent particles in the coloring agent particles dispersion had a volume average particle diameter of 135 nm.

[Production and Measurement of Toner]

Example 1

(First Aggregated Particle Forming Step)

Hybrid resin particle dispersion A: 100 parts
Styrene acrylic resin particle dispersion B: 362.5 parts
Release agent particle dispersion 1: 70 parts
Coloring agent particle dispersion: 66.7 parts
Ion-exchanged water: 1,000 parts
Anionic surfactant (Dowfax 2A1 manufactured by The Dow Chemical Company): 5.0 parts These materials were put into a 3 L reaction vessel equipped with a thermometer, a pH meter, and a stirrer, and the pH was adjusted to 3.0 while nitric acid was added at a temperature of 25° C. Thereafter, while the mixture was dispersed at 5,000 rpm with a homogenizer (ULTRA-TURRAX T50 manufactured by IKA), 150 parts of a magnesium chloride aqueous solution having a concentration of 2.0 mass % as a flocculant was added and dispersed for 6 minutes.

Thereafter, a stirrer and a mantle heater were installed in the reaction vessel, the temperature was raised at a temperature rising rate of 0.2° C./min to 40° C. and at a temperature rising rate of 0.05° C./min from a temperature higher than 40° C. to 53° C. while the rotation speed of the stirrer was adjusted to 1,000 rpm so that the slurry was sufficiently stirred, and the particle diameters were measured every 10 minutes by Multisizer II (Aperture diameter: 50 manufactured by Beckman Coulter, Inc.). The temperature was maintained when the volume-average particle diameter reached 4.2 whereby a first aggregated particle dispersion was obtained.

(Second Aggregated Particle Forming Step)

With the same rotation speed of the stirrer as in the first aggregated particle forming step, 125 parts of the styrene acrylic resin particle dispersion B was added to the first aggregated particle dispersion over 5 minutes, and the resulting material was held for 20 minutes, whereby a second aggregated particle dispersion was obtained.

(Fusion-Coalescence Step)

A 20 mass % aqueous solution of EDTA (ethylenediaminetetraacetic acid) in an amount of 15 parts was added to a reaction vessel in which the second aggregated particle dispersion was held at 50° C. for 30 minutes. Thereafter, a 1 mol/L sodium hydroxide aqueous solution was added, and the pH of the dispersion was controlled to 9.0. Next, the mixture was heated to 90° C. (coalescence temperature) at a heating rate of 1° C./min and maintained at 90° C. while the pH is adjusted to 9.0 every 5° C. The shape and surface property of the particles were observed with an optical microscope and a field emission scanning electron microscope (FE-SEM), and after 4 hours (coalescence time) from the start of holding at 90° C. at which coalescence of the particles was confirmed, the vessel was cooled to 30° C. over 5 minutes with cooling water. The average circularity of the toner particles measured with a flow particle image analyzer was 0.966.

The cooled slurry was caused to pass through a nylon mesh having an opening of 15 μm to remove coarse particles, and the toner slurry passed through the mesh was filtered under reduced pressure with an aspirator. The solid content remaining on the filter paper was pulverized as finely as possible by hand, charged into ion-exchanged water of 10 times the solid content at a temperature of 30° C., and stirred and mixed for 30 minutes. Next, the mixture was filtered under reduced pressure with an aspirator, and the solid remaining on the filter paper was pulverized as finely as possible by hand, charged into ion-exchanged water of 10 times the solid content at a temperature of 30° C., stirred and mixed for 30 minutes, and then filtered under reduced pressure with an aspirator again, and the electrical conductivity of the filtrate was measured. This operation was repeated until the electrical conductivity of the filtrate reached 10 μS/cm or less, and the solid content was washed.

The washed solid content was then finely pulverized with a wet dry granulator (comil) and vacuum-dried in an oven of 35° C. for 36 hours, whereby toner particles were obtained. The toner particles had a volume-average particle diameter of 5.7 The styrene content ("styrene amount" in the table), the ratio Yw/Ys, and the ratio Yw/Yh of the obtained toner particles are shown in Table 2.

(Addition of External Additive)

Next, 1.5 parts of hydrophobic silica (manufactured by Nippon Aerosil Co., Ltd., RY50) was added as an external additive to 100 parts of the obtained toner particles, and the mixture was mixed at 13,000 rpm for 30 seconds using a sample mill. Thereafter, the mixture was sieved with a vibration sieve having an opening of 45 whereby a toner for electrostatic charge image development of Example 1 was obtained.

(Measurement)

For the toner obtained in Example 1, the number average of the release agent domain diameters, the standard deviation of the release agent domain diameters, the large-diameter domain proportion ("Large-diameter proportion" in the table), and the average circularity of the release agent domains ("Circularity" in the table) were measured according to the methods described above. The results are shown in Table 2.

Examples 2 to 15 and Comparative Examples 1 to 4

Toners were prepared and measured in the same manner as in Example 1 except that the amount of charged materials and the step conditions were changed as shown in Table 1.

[Production of Developer]

A developer was obtained by mixing 8 parts of the obtained toner and 100 parts of the carrier shown below.

—Production of Carrier—

Ferrite particles (average particle diameter: 50 μm): 100 parts
Toluene: 14 parts
Styrene-methyl methacrylate copolymer (copolymerization ratio 15/85): 3 parts
Carbon black: 0.2 parts The above-described components excluding the ferrite particles were dispersed with a sand mill to prepare a dispersion, and this dispersion was put into a vacuum degassing type kneader together with the ferrite particles, and dried under reduced pressure while being stirred, whereby a carrier was obtained.

[Evaluation] <Evaluation of Fogging>

Evaluation of fogging was performed as follows. An image sample having a printing rate of 2% (image density 2%) was printed on 2,000 sheets of P paper in an environment of high temperature and high humidity (28° C. and 85% RH) with DocuCentre Color 450 (manufactured by FUJIFILM Business Innovation Corp.). Thereafter, under the same environment, an image sample having a printing rate of 10% was printed on 1,000 sheets, and then the image sample on the 1,000th sheet with a printing rate of 10% was evaluated according to the following criteria. The results are shown in Table 2.

A (⊙): No fogging is recognized at all by visual determination.

B (○): Fogging is very slightly recognized but at an acceptable level by visual determination.

C (×): Fogging is recognized at a level determined as unacceptable by visual determination.

<Evaluation of Fixability>

Using the obtained developer, 10,000 images having an image density of 20% were output to A4 size J paper (manufactured by Fuji Xerox Co., Ltd.) by a modified machine of DocuCentre Color 450 manufactured by FUJIFILM Business Innovation Corp. under an environment of 28° C. and 85% RH. The fixing temperature was 180° C. The image on the 10,000th sheet was visually checked, and the presence or absence of offset was evaluated according to the following evaluation criteria. A to C were defined as an acceptable range. The results are shown in Table 2.

—Evaluation Criteria—

A: No offset is confirmed.

B: Offset of less than 10% of the image area is confirmed.

C: Offset of 10% or more of the image area is confirmed.

<Evaluation of Color Streaks>

The developer was left to stand in an environment of 28° C. and 85% RH for 24 hours, and then an image having a low image density (image density of 1%) were continuously output on 100,000 sheets of A4 size paper using a modified machine of 700 Digital Color Press manufactured by FUJIFILM Business Innovation Corp. in an environment of 28° C. and 85% RH. The last 100 sheets were visually observed, and the generation of color streaks was categorized as follows. A and B are levels at which there is no problem in practical use. The results are shown in Table 2.

A: No color streaks are generated

B: Color streaks are generated on 1 or more and 5 or less sheets (practically acceptable range)

C: Color streaks were generated on 6 or more sheets (practically unacceptable level)

TABLE 1

| | First aggregated particle forming step | | | | | | |
|---|---|---|---|---|---|---|---|
| | Charge amount of resin dispersion A part | Charge amount of resin dispersion B part | Charge amount of resin dispersion C part | Charge amount of resin dispersion D part | Type of release agent dispersion — | Charge amount of release agent dispersion part | Charge amount of coloring agent dispersion part |
| Example 1 | 100.0 | 362.5 | 0.0 | 0.0 | 1 | 70.0 | 66.7 |
| Example 2 | 100.0 | 362.5 | 0.0 | 0.0 | 3 | 70.0 | 66.7 |
| Example 3 | 100.0 | 362.5 | 0.0 | 0.0 | 3 | 70.0 | 66.7 |
| Example 4 | 100.0 | 362.5 | 0.0 | 0.0 | 1 | 70.0 | 66.7 |
| Example 5 | 100.0 | 362.5 | 0.0 | 0.0 | 5 | 70.0 | 66.7 |
| Example 6 | 100.0 | 362.5 | 0.0 | 0.0 | 2 | 70.0 | 66.7 |
| Example 7 | 100.0 | 362.5 | 0.0 | 0.0 | 2 | 70.0 | 66.7 |
| Example 8 | 100.0 | 362.5 | 0.0 | 0.0 | 6 | 70.0 | 66.7 |
| Example 9 | 0.0 | 362.5 | 0.0 | 100.0 | 1 | 70.0 | 66.7 |
| Example 10 | 100.0 | 243.8 | 190.0 | 0.0 | 1 | 70.0 | 66.7 |
| Example 11 | 20.0 | 437.5 | 0.0 | 0.0 | 1 | 60.0 | 26.7 |
| Example 12 | 50.0 | 431.3 | 0.0 | 0.0 | 1 | 50.0 | 13.3 |
| Example 13 | 100.0 | 243.8 | 110.0 | 0.0 | 1 | 150.0 | 66.7 |
| Example 14 | 200.0 | 312.5 | 0.0 | 0.0 | 1 | 50.0 | 66.7 |
| Example 15 | 10.0 | 368.8 | 0.0 | 0.0 | 1 | 150.0 | 66.7 |
| Comparative Example 1 | 100.0 | 362.5 | 0.0 | 0.0 | 4 | 70.0 | 66.7 |
| Comparative Example 2 | 100.0 | 362.5 | 0.0 | 0.0 | 1 | 70.0 | 66.7 |
| Comparative Example 3 | 100.0 | 362.5 | 0.0 | 0.0 | 2 | 70.0 | 66.7 |
| Comparative Example 4 | 100.0 | 362.5 | 0.0 | 0.0 | 1 | 70.0 | 66.7 |

| | First aggregated particle forming step | | Second aggregated particle forming step | | Fusion-coalescence step | |
|---|---|---|---|---|---|---|
| | Charge amount of ion-exchanged water part | Rotation speed of stirring rpm | Charge amount of resin dispersion B part | Charge amount of resin dispersion C part | Coalescence temperature ° C. | Coalescence time hr |
| Example 1 | 1000 | 1000 | 125.0 | 0.0 | 90 | 4 |
| Example 2 | 1000 | 1000 | 125.0 | 0.0 | 85 | 3 |
| Example 3 | 1000 | 1000 | 125.0 | 0.0 | 94 | 5 |
| Example 4 | 1000 | 700 | 125.0 | 0.0 | 90 | 4 |
| Example 5 | 1000 | 1000 | 125.0 | 0.0 | 90 | 4 |
| Example 6 | 1000 | 700 | 125.0 | 0.0 | 94 | 4.5 |
| Example 7 | 1000 | 500 | 125.0 | 0.0 | 94 | 4.5 |
| Example 8 | 1000 | 1000 | 125.0 | 0.0 | 90 | 4 |
| Example 9 | 1001 | 1000 | 125.0 | 0.0 | 90 | 4 |
| Example 10 | 930 | 1000 | 0.0 | 200.0 | 90 | 4 |
| Example 11 | 1058 | 1000 | 125.0 | 0.0 | 90 | 4 |

TABLE 1-continued

| | | | | | | |
|---|---|---|---|---|---|---|
| Example 12 | 1055 | 1000 | 125.0 | 0.0 | 90 | 4 |
| Example 13 | 930 | 1000 | 0.0 | 200.0 | 90 | 4 |
| Example 14 | 971 | 1000 | 125.0 | 0.0 | 90 | 4 |
| Example 15 | 1005 | 1000 | 125.0 | 0.0 | 90 | 4 |
| Comparative Example 1 | 1001 | 1000 | 125.0 | 0.0 | 90 | 4 |
| Comparative Example 2 | 1001 | 500 | 125.0 | 0.0 | 90 | 4 |
| Comparative Example 3 | 1001 | 1000 | 125.0 | 0.0 | 94 | 5.5 |
| Comparative Example 4 | 1001 | 1000 | 125.0 | 0.0 | 90 | 4 |

TABLE 2

| | Ratio of resin release agent | | | Release agent domain | | | | Evaluation | | |
|---|---|---|---|---|---|---|---|---|---|---|
| | Styrene amount (mass %) | Ratio Yw/Ys | Ratio Yw/Yh | Number average (μm) | Standard deviation | Large-diameter proportion (% by number) | Circularity | Fogging | Color streak | Fixability |
| Example 1 | 79 | 0.088 | 0.70 | 1.2 | 0.11 | 0 | 0.97 | A | A | A |
| Example 2 | 79 | 0.088 | 0.70 | 0.1 | 0.13 | 0 | 0.98 | B | A | B |
| Example 3 | 79 | 0.088 | 0.70 | 1.5 | 0.21 | 0.3 | 0.95 | B | A | A |
| Example 4 | 79 | 0.088 | 0.70 | 1.1 | 0.5 | 0.2 | 0.97 | B | A | A |
| Example 5 | 79 | 0.088 | 0.70 | 0.6 | 0.12 | 0 | 0.97 | B | A | B |
| Example 6 | 79 | 0.088 | 0.70 | 1.3 | 0.42 | 0.5 | 0.97 | A | A | B |
| Example 7 | 79 | 0.088 | 0.70 | 1.4 | 0.45 | 0.6 | 0.97 | B | A | B |
| Example 8 | 79 | 0.088 | 0.70 | 0.9 | 0.11 | 0 | 0.88 | A | A | B |
| Example 9 | 78 | 0.090 | — | 1 | 0.32 | 0 | 0.97 | A | A | B |
| Example 10 | 40 | 0.175 | 0.70 | 0.9 | 0.14 | 0 | 0.97 | B | B | A |
| Example 11 | 90 | 0.067 | 3.00 | 0.8 | 0.12 | 0 | 0.97 | A | B | B |
| Example 12 | 90 | 0.056 | 1.00 | 0.8 | 0.13 | 0 | 0.97 | B | B | B |
| Example 13 | 40 | 0.374 | 1.50 | 1.4 | 0.09 | 0 | 0.97 | A | B | A |
| Example 14 | 72 | 0.069 | 0.25 | 0.7 | 0.09 | 0 | 0.97 | B | B | A |
| Example 15 | 79 | 0.190 | 15.00 | 1.3 | 0.17 | 0 | 0.97 | A | A | B |
| Comparative Example 1 | 79 | 0.088 | 0.70 | 0.05 | 0.07 | 0 | 0.95 | C | B | C |
| Comparative Example 2 | 79 | 0.088 | 0.70 | 1.5 | 0.6 | 0.2 | 0.97 | C | B | A |
| Comparative Example 3 | 79 | 0.088 | 0.70 | 1.6 | 0.4 | 0.3 | 0.96 | C | B | A |
| Comparative Example 4 | 79 | 0.088 | 0.70 | 0.7 | 0.05 | 0 | 0.97 | B | C | B |

It is clear from the above-described results that the toners of Examples are capable of inhibiting both generation of color streaks due to cleaning failure and fogging in an image formed in a high-temperature and high-humidity environment.

What is claimed is:

1. A toner for electrostatic charge image development comprising toner particles, the toner particles containing a binder resin containing a vinyl resin and a release agent containing an ester wax, wherein in sections of the toner particles, a number average of equivalent circle diameters of sections of domains of the release agent is 0.10 μm or more and 1.5 μm or less, and a standard deviation of the equivalent circle diameters is more than 0.05 and 0.5 or less.

2. The toner for electrostatic charge image development according to claim 1, wherein the sections of domains of the release agent having an equivalent circle diameter of one third or more of a volume-average particle diameter of the toner particles is 0.5% by number or less relative to the total number of the sections of domains of the release agent present in the sections of the toner particles.

3. The toner for electrostatic charge image development according to claim 1, wherein the sections of domains of the release agent have a circular shape.

4. The toner for electrostatic charge image development according to claim 3, wherein the sections of domains of the release agent have an average circularity of 0.90 or more.

5. The toner for electrostatic charge image development according to claim 1, wherein the vinyl resin contains at least one selected from the group consisting of a hybrid resin in which a crystalline polyester resin unit and a non-crystalline resin unit other than a polyester resin are chemically bonded to each other and a styrene (meth)acrylic resin.

6. The toner for electrostatic charge image development according to claim 5, wherein a content of a unit derived from a monomer having a styrene skeleton in the vinyl resin is 40 mass % or more and 90 mass % or less relative to the entire toner particles.

7. The toner for electrostatic charge image development according to claim 5, wherein when a content of a unit derived from a monomer having a styrene skeleton in the vinyl resin relative to the entire toner particles is Ys mass %, and a content of the release agent relative to the entire toner particles is Yw mass %, a value of a ratio Yw/Ys is 0.055 or more and 0.375 or less.

8. The toner for electrostatic charge image development according to claim 5, wherein when a content of the hybrid resin relative to the entire toner particles is Yh mass %, and a content of the release agent relative to the entire toner particles is Yw mass %, a value of a ratio Yw/Yh is 0.25 or more and 15 or less.

9. An electrostatic charge image developer comprising the toner for electrostatic charge image development according to claim 1.

10. A toner cartridge containing the toner for electrostatic charge image development according to claim 1, the toner cartridge being detachably attached to an image forming apparatus.

11. A process cartridge comprising a developing unit that contains the electrostatic charge image developer according to claim 9 and develops, as a toner image, an electrostatic charge image formed on a surface of an image holding member by using the electrostatic charge image developer, the process cartridge being detachably attached to an image forming apparatus.

12. An image forming apparatus comprising:

an image holding member;

a charging unit that charges a surface of the image holding member;

an electrostatic charge image forming unit that forms an electrostatic charge image on the charged surface of the image holding member;

a developing unit that contains the electrostatic charge image developer according to claim 9 and develops, as a toner image, the electrostatic charge image formed on the surface of the image holding member by using the electrostatic charge image developer;

a transfer unit that transfers the toner image formed on the surface of the image holding member onto a surface of a recording medium; and a fixing unit that fixes the toner image transferred onto the surface of the recording medium.

13. An image forming method comprising:

charging a surface of an image holding member;

forming an electrostatic charge image on the charged surface of the image holding member;

developing, as a toner image, the electrostatic charge image formed on the surface of the image holding member by using the electrostatic charge image developer according to claim 9;

transferring the toner image formed on the surface of the image holding member onto a surface of a recording medium; and fixing the toner image transferred onto the surface of the recording medium.

* * * * *